United States Patent [19]
Ito

[11] Patent Number: 5,257,406
[45] Date of Patent: Oct. 26, 1993

[54] SYSTEM AND METHOD FOR CONTROLLING RADIO COMMUNICATION BASE ON A STORED SCHEDULE

[75] Inventor: Koichi Ito, Hino, Japan

[73] Assignee: Kabushiki Kaisha Toshiba, Kawasaki, Japan

[21] Appl. No.: 680,234

[22] Filed: Apr. 3, 1991

[30] Foreign Application Priority Data

Apr. 4, 1990 [JP] Japan .................................. 2-89543

[51] Int. Cl.$^5$ ............................................... H04B 7/26
[52] U.S. Cl. .................................... 455/56.1; 379/59; 379/60; 455/33.1; 455/33.2; 455/54.1
[58] Field of Search ................... 455/33.1, 33.2, 33.4, 455/53.1, 54.1, 54.2, 56.1; 379/59, 60, 63

[56] References Cited

U.S. PATENT DOCUMENTS 4,843,622 6/1989 Yotsutani et al. ..................... 379/59

FOREIGN PATENT DOCUMENTS 0122328 5/1988 Japan .................................... 379/59

0119325 5/1990 Japan .................................. 455/33.1

Primary Examiner—Reinhard J. Eisenzopf
Assistant Examiner—Chi Pham
Attorney, Agent, or Firm—Finnegan, Henderson, Farabow, Garrett & Dunner

[57] ABSTRACT

In a radio communication system which comprises a plurality of base units and at least one radio mobile terminal, for the purpose of connecting an incoming signal to the radio mobile terminal through a suitable one of the plurality of base units, there is provided a memory for storing schedule data containing data of radio zones of the base units where the radio mobile terminal is to be located and time periods during which the radio mobile terminal is to be located in the radio zones so that, when an incoming signal is transmitted from a wired communication system, one of the base units to be used for the connection of the incoming signal is selected on the basis of the schedule data stored in the memory to execute the connection of the incoming signal to the radio mobile terminal.

20 Claims, 26 Drawing Sheets

SYSTEM AND METHOD FOR CONTROLLING RADIO COMMUNICATION BASE ON A STORED SCHEDULE

BACKGROUND OF THE INVENTION

1. Field of the Invention

The present invention relates to radio communication systems and its control methods and more particularly, to a radio communication system which includes a plurality of base units and at least one radio mobile terminal to execute the connecting operation of an incoming-signal from any one of the plurality of base units to the radio mobile terminal and a method for controlling the radio communication system.

2. Description of the Related Art

A conventional radio communication system of the type referred to is arranged as shown in FIG. 26. In the drawing, a radio control station 101 is connected at its one side with a wired telephone network 102 and also at the other side with radio base stations 103-1, 103-2 and 103-3 through their wired lines. The radio base stations 103-1, 103-2 and 103-3 have radio zones 104-1, 104-2 and 104-3 respectively. When a portable radio telephone set 105 as a mobile station is located in the radio zone 104-2, the portable radio telephone set 105 may be coupled with the radio base station 103-2 through a radio link, in which case the radio telephone set 105 can communicate with the wired telephone network 102 through the radio control station 101 and the radio base station 103-2.

When the portable radio telephone set 105 issues a calling signal, the calling signal transmitted from the telephone set 105 is received at any of the radio base stations 103-1 to 103-3, even when the radio telephone set 105 is located in any of the radio zones 104-1 to 104-3, so that an interconnection control between the portable radio telephone set 105 and the wired telephone network 102 is realized to start a communication.

On the other hand, when an incoming signal directed to the portable radio telephone set 105 is sent from the wired telephone network 102, the system must inform the radio telephone set 105 of the presence of the incoming signal.

To this end, in the conventional system, the radio base stations 103-1 to 103-3 transmit the incoming signal respectively under control of the radio control station 101, whereby the portable radio telephone set 105 can receive the incoming signal even when the telephone set 105 is located in any of the radio zones 104-1 to 104-3. Therefore, the base stations 103-1 to 103-3 must use their control channels for the transmission of the incoming signal. Since the incoming signal is transmitted even to the radio zones where the portable radio telephone set 105 is not present, the system performs useless data communication. When each radio zone is small and a large number of such radio zones exist, a large quantity of useless data communication must be performed, which is undesirable from the viewpoint of effective use of electromagnetic waves.

For the purpose of avoiding the above disadvantage, there has been proposed such a method that the location of the portable radio telephone set 105 belonging to one of the radio zones 104-1 to 104-3 is previously registered in the radio control station 101 so that, when the radio control station 101 receives an incoming signal, the control station controls the radio base station of the registered radio zone to transmit the incoming signal to the corresponding portable radio telephone set 105, for example, as disclosed in U.S. patent application Ser. No. 07/408249. In this case, the location of the portable radio telephone set 105 is registered by intermittent transmission of a registration signal from the portable telephone set 105 in its wait or ready state to the radio control station 101 through its control channel to inform the control station 101 of the current location of the portable telephone set 105.

However, since the control channel is frequently used, this inevitably requires many control channels for traffic processing, thus disturbing the normal signal transmitting of the other portable telephone sets (not shown). In addition, since the registration requires the repetitive transmission of the registration signal from the portable radio telephone set, the battery of the portable telephone set as its power source is undesirably exhausted.

As discussed above, in the conventional radio communication system, when an incoming signal is received, the incoming signal is transmitted from the plurality of radio base stations through their different control channels. Alternatively, a signal for registering the radio zone to which the incoming signal is to be transmitted is intermittently transmitted from each portable radio telephone set. As a result, the traffic quantity of the control channel is increased and thus a large number of control channels are required. Thus, radio channels by electromagnetic waves cannot effectively be used. Further, due to the intermittent transmission of the signal for registration of the radio zone from each portable radio telephone set, the battery of the portable radio telephone set is greatly consumed.

SUMMARY OF THE INVENTION

It is therefore an object of the present invention to provide a radio communication system which can realize the effective use of radio channels by electromagnetic waves and the power saving of a portable radio telephone set and which does not require the troublesome registering operation, and also to provide a method for controlling the radio communication system.

To achieve the object of the present invention, in a radio communication system which comprises a plurality of base units and at least one radio mobile terminal, for the purpose of connecting an incoming signal to the radio mobile terminal through suitable one of the plurality of base units, there is provided a memory for storing a schedule data containing data of radio zones of the base units where the radio mobile terminal is to be located and time periods during which the radio mobile terminal is to be located in the radio zones so that, when an incoming signal is transmitted from a wired communication system, one of the base units to be used for the connection of the incoming signal is determined on the basis of the schedule data stored in the memory to execute the connection of the incoming signal to the radio mobile terminal.

In accordance with one aspect of the present invention, a radio communication system comprises a radio mobile terminal; a plurality of base units each having a different radio zone and connected through a radio link with the radio mobile terminal; a wired communication system connected via wired lines with the plurality of base units; an input section for inputting a schedule data including data on the radio zones in which the radio terminal is to be located and time periods during which the radio terminal is to be located in the radio zones, the schedule data being used to select the base units; a memory for storing the schedule data inputted by the input section; and incoming-signal connecting section, when an incoming signal is sent from the wired communication system, for causing a base device selected in accordance with the schedule data stored in the memory to connect the incoming signal to the radio mobile terminal.

DESCRIPTION OF THE PREFERRED EMBODIMENTS

Embodiments of the present invention will be explained in detail with reference to the attached drawings.

Figure 1:
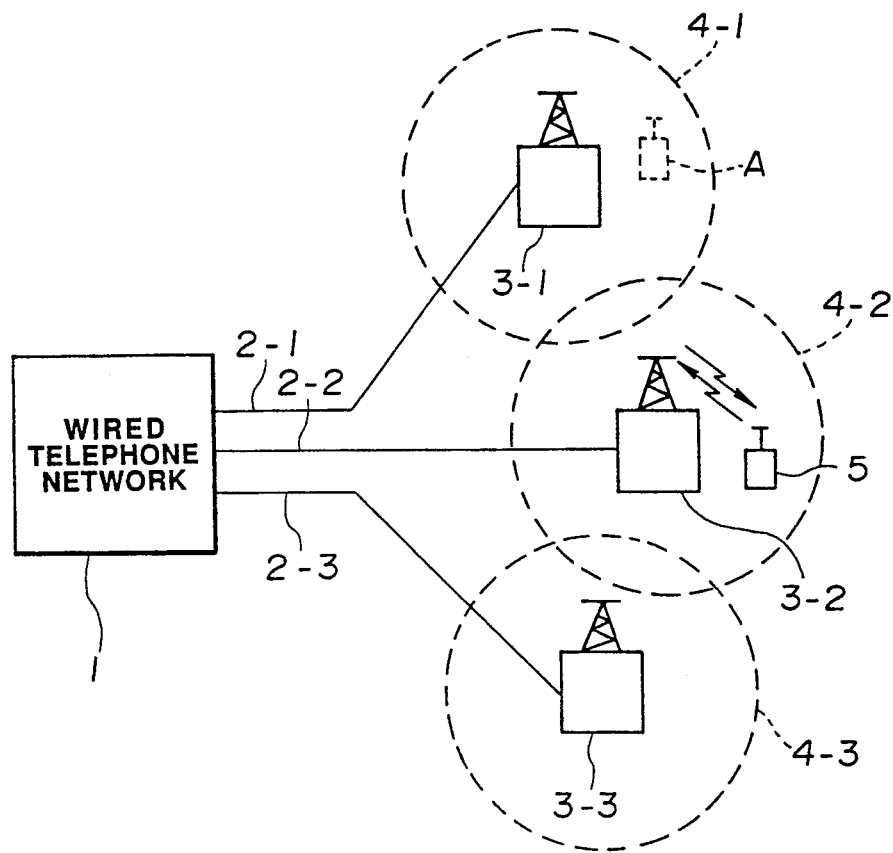
FIG. 1 is a block diagram schematically showing a radio communication system in accordance with a first embodiment of the present invention.

Referring first to FIG. 1, there is schematically shown a block diagram of an arrangement of a radio communication system in accordance with a first embodiment of the present invention. In the drawing, the illustrated radio communication system includes a wired telephone network 1, wired lines 2-1 to 2-3, radio base stations 3-1 to 3-3, radio zones 4-1 to 4-3, and a portable radio telephone set 5. The wired lines 2-1 to 2-3 form part of the wired telephone network 1.

Previously given to the radio zones 4-1, 4-2 and 4-3 are respective station numbers "011", "012" and "013". Assume now that the portable radio telephone set 5 is located in the radio zone 4-2. Then the portable radio telephone set 5 has a telephone number of, for example, "012-0019" attached with the station number "012" of the radio zone 4-2, and the telephone number "012-0019" is registered as the telephone number of the portable radio telephone set 5 in an exchange (not shown) of the wired telephone network 1.

The wired telephone network 1 is, e.g., a public telephone network which performs exchanging/connecting operation between lines including the wired lines 2-1 to 2-3. The portable radio telephone set 5 located, for example, in the radio zone 4-2 may be coupled with the radio base station 3-2 through its radio link. For this reason, the portable radio telephone set 5 may be connected to the wired telephone network 1 through the radio base station 3-2 to realize a communication between the portable telephone set 5 and a subscriber terminal in the wired telephone network 1.

The respective radio base stations 3-1 to 3-3, which perform communication control based on a multi-channel access system, can communicate with the portable radio telephone sets located in the respective radio zones 4-1 to 4-3 with use of, for example, a single control channel and a plurality of speech channels. For example, the radio base station 3-2 can transmit and receive a control data to and from the portable radio telephone set 5 with use of the single control channel while transmitting and receiving a voice signal to and from the portable radio telephone set 5 with use of an idle one of the speech channels. At this time, the radio base station 3-2 can perform communication of other voice signals with respect to other portable radio telephone sets with use of the remaining speech channels other than the speech channel being used by the portable radio telephone set 5. Accordingly, a plurality of the portable radio telephone sets belonging to the single radio zone can perform respective communications at the same time.

Figure 2:
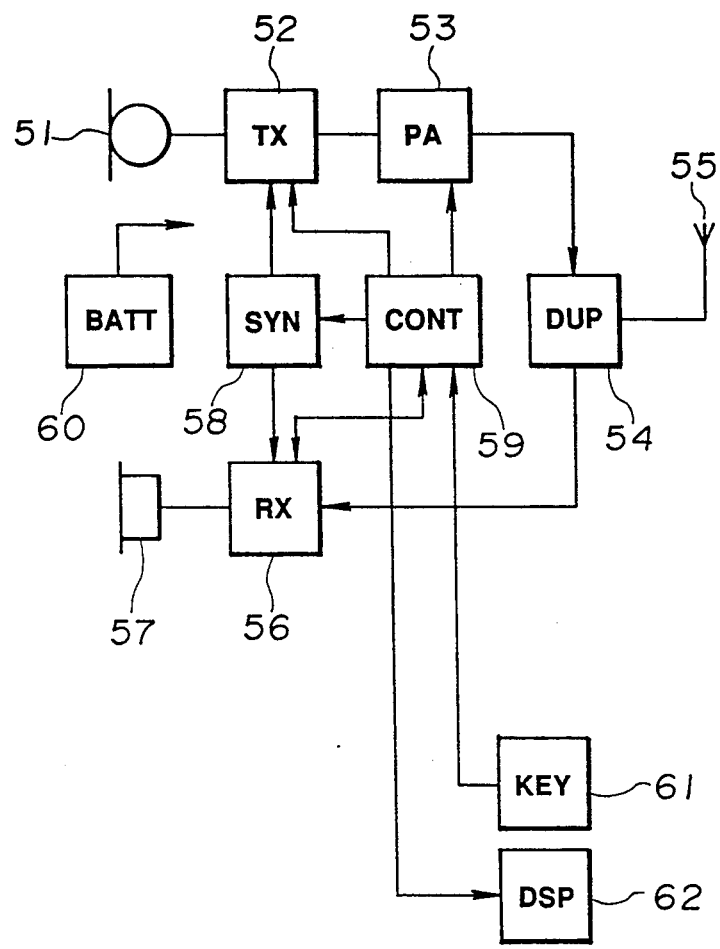
FIG. 2 is a block diagram showing an arrangement of a portable radio telephone set used in the radio communication system of FIG. 1.

Each portable radio telephone set 5 has such a structure as shown in FIG. 2, in which a voice signal emitted from a handset transmitter 51 and a data signal issued from a controller 59 are applied to a transmitter 52 as its modulation inputs to be modulated therein. A modulated signal output from the transmitter 52 is amplified at a power amplifier 53 and then sent through an antenna duplexer 54 to an antenna 55, from which an amplified signal is transmitted in the form of electromagnetic up waves. Electromagnetic down waves transmitted from the radio base station 3-2 shown in FIG. 1, on the other hand, are received at the antenna 55 as a received input and then sent to a receiver 56 through the antenna duplexer 54. The receiver 56 applies a voice signal to a handset receiver 57 as its demodulated output to sound the voice at the handset receiver. The receiver 56 also applies a data signal to the controller 59 as the other demodulated output. A synthesizer 58 applies a frequency signal on the radio channel being used to the transmitter 52 and to the receiver 56. The controller 59 performs general control over the respective parts of the portable radio telephone set 5. An input key board 61, which is provided with a hook button, dial buttons, function buttons and so on, is operated to enter various sorts of data into the controller 59. A display unit 59 is provided to display various sorts of data thereon under the controller 59. A battery 60 is used as the power source of the portable radio telephone set 5.

Figure 3:
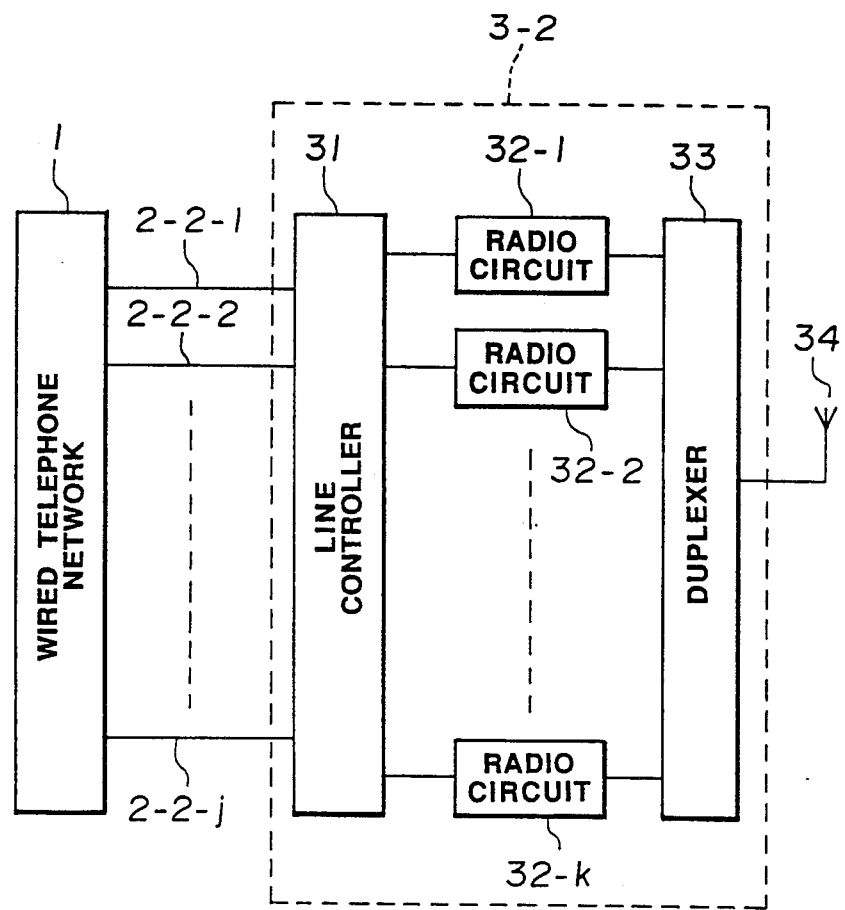
FIG. 3 is a block diagram showing a schematic arrangement of a radio base station used in the radio communication system of FIG. 1.

FIG. 3 is a schematic arrangement of the radio base station in FIG. 1. In FIG. 3, a line controller 31 acts to perform exchanging/connecting operation between wired lines 2-2-1 to 2-2-j of the wired telephone network 1 and a plurality of radio circuits 32-2 to 32-k. The respective radio circuits 32 are commonly connected to an antenna 34 through an antenna duplexer 33 to transmit and receive their electromagnetic waves to and from a plurality of the portable radio telephone sets located within the radio zone of this radio base station. More specifically, a voice signal from the wired telephone network 1 is applied through the line controller 31 to one of the radio circuits 32 as its modulation input to be modulated therein. A data signal formed in the radio circuit is also modulated. A modulated output of the radio circuit 32 is supplied through the antenna duplexer 33 to the antenna 34, from which the modulated signal is radiated in the form of electromagnetic down waves. Meanwhile, electromagnetic down waves transmitted from the portable radio telephone set located in the radio zone of the radio base station are received at the antenna 34 as a received input and then sent through the antenna duplexer 33 to corresponding one of the radio circuits 32 to be demodulated therein. A voice signal as a demodulated output of the corresponding radio circuit 32 is supplied through the line controller 31 to the wired telephone network 1, while a data signal as the other demodulated output of the corresponding radio circuit 32 is processed therein.

Figure 4:
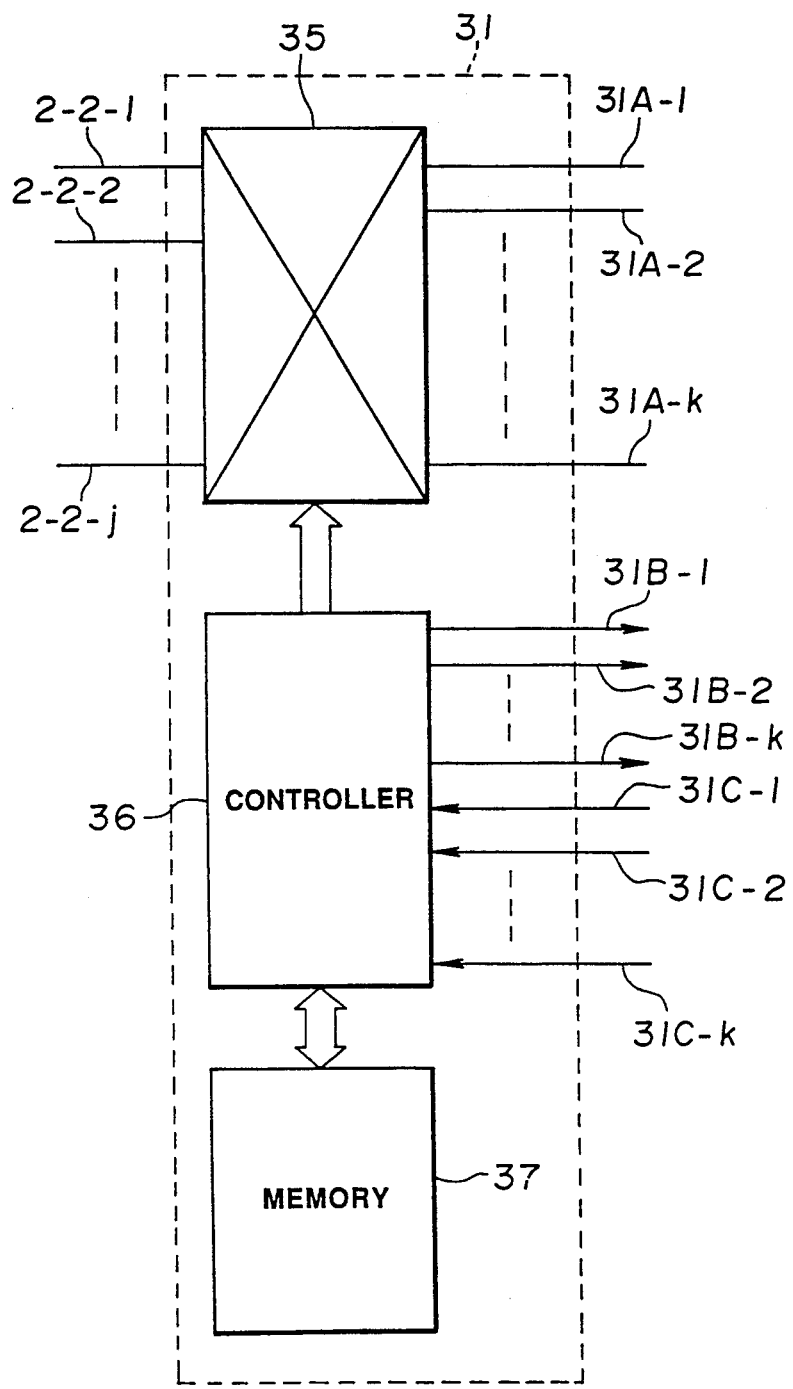
FIG. 4 is a block diagram showing an arrangement of a line controller in the radio base station of FIG. 3.

The line controller 31 in FIG. 3 has such a structure as shown in FIG. 4. More specifically, the line controller 31 comprises a switch circuit 35 for exchanging/connection operation between the wired lines 2-2-1 to 2-2-j and speech lines 31A-1 to 31A-k of the radio circuits 32-1 to 32-k, a control circuit 36 for performing control over the switch circuit 35 and also for performing integrated control over the radio circuits 32-1 to 32-k via a plurality of data lines 31B-1 to 31B-k and 31C-1 to 31C-k, and a memory circuit 37 for storing therein various sorts of data.

Figure 5:
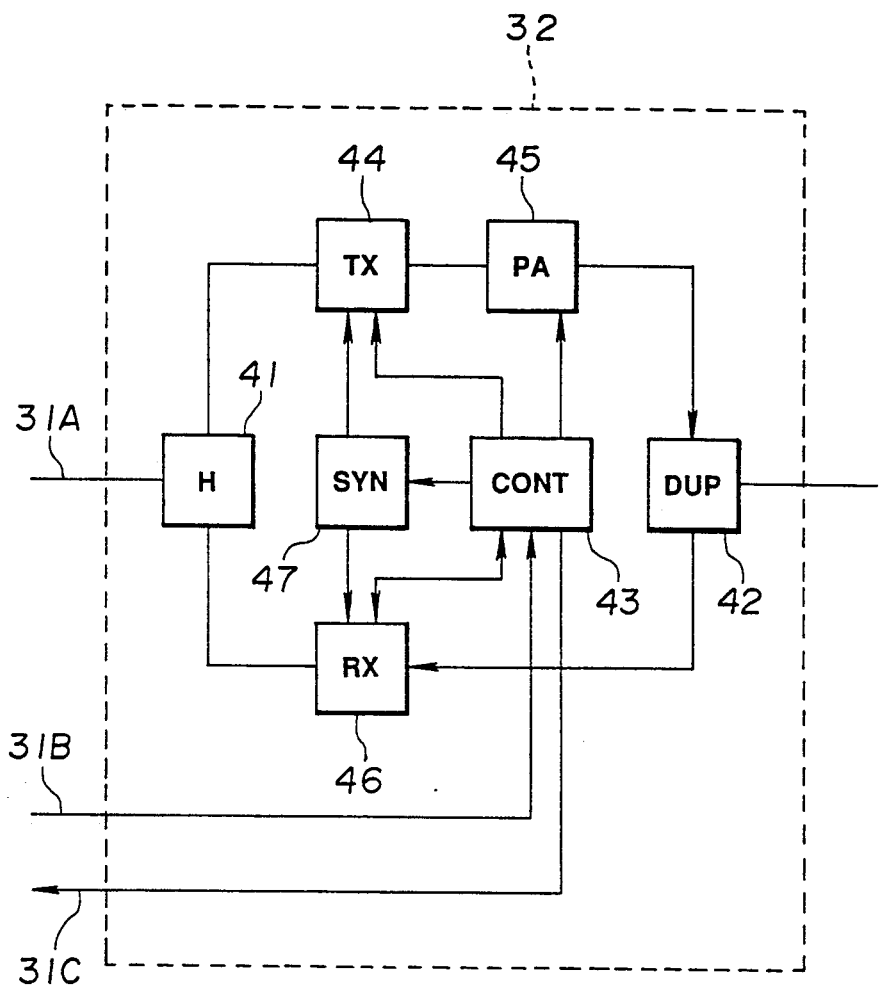
FIG. 5 is a block diagram showing an arrangement of a radio circuit in the radio base station of FIG. 3.

Each of the radio circuits 32 in FIG. 3 is arranged as shown in FIG. 5, wherein a hybrid circuit 41 is connected to the speech line 31A of the switch circuit 35 in FIG. 4 and a duplexer 42 is connected to the antenna duplexer 33 in FIG. 3. A voice signal received from the speech line 31A through the hybrid circuit 41 as well as a data signal issued from a control circuit 43 are applied to a transmitter 44 as its modulation inputs to be modulated therein. A modulated signal as the output of the transmitter 44 is amplified at a power amplifier 45 and then sent through the antenna duplexer 33 of FIG. 3 to the antenna 34, from which the modulated signal is transmitted in the form of electromagnetic down waves. Meanwhile, when electromagnetic up waves are received at the antenna 34 as a received input, the received input is sent through the antenna duplexer 33 to the duplexer 42 and further applied therefrom to a receiver 46. The receiver 46 in turn sends a voice signal as its demodulated output onto the voice line 31A via the hybrid circuit 41 and also sends a data signal as the other demodulated output to the control circuit 43. A synthesizer 47 applies a frequency signal on the radio channel being used to the transmitter 44 and also to the receiver 46. The control circuit 43 performs control over the respective parts of the radio circuit to send and receive data signals to and from the control circuit 36 of the line controller 31 of FIG. 4 through data lines 31B and 31C.

Figure 6:
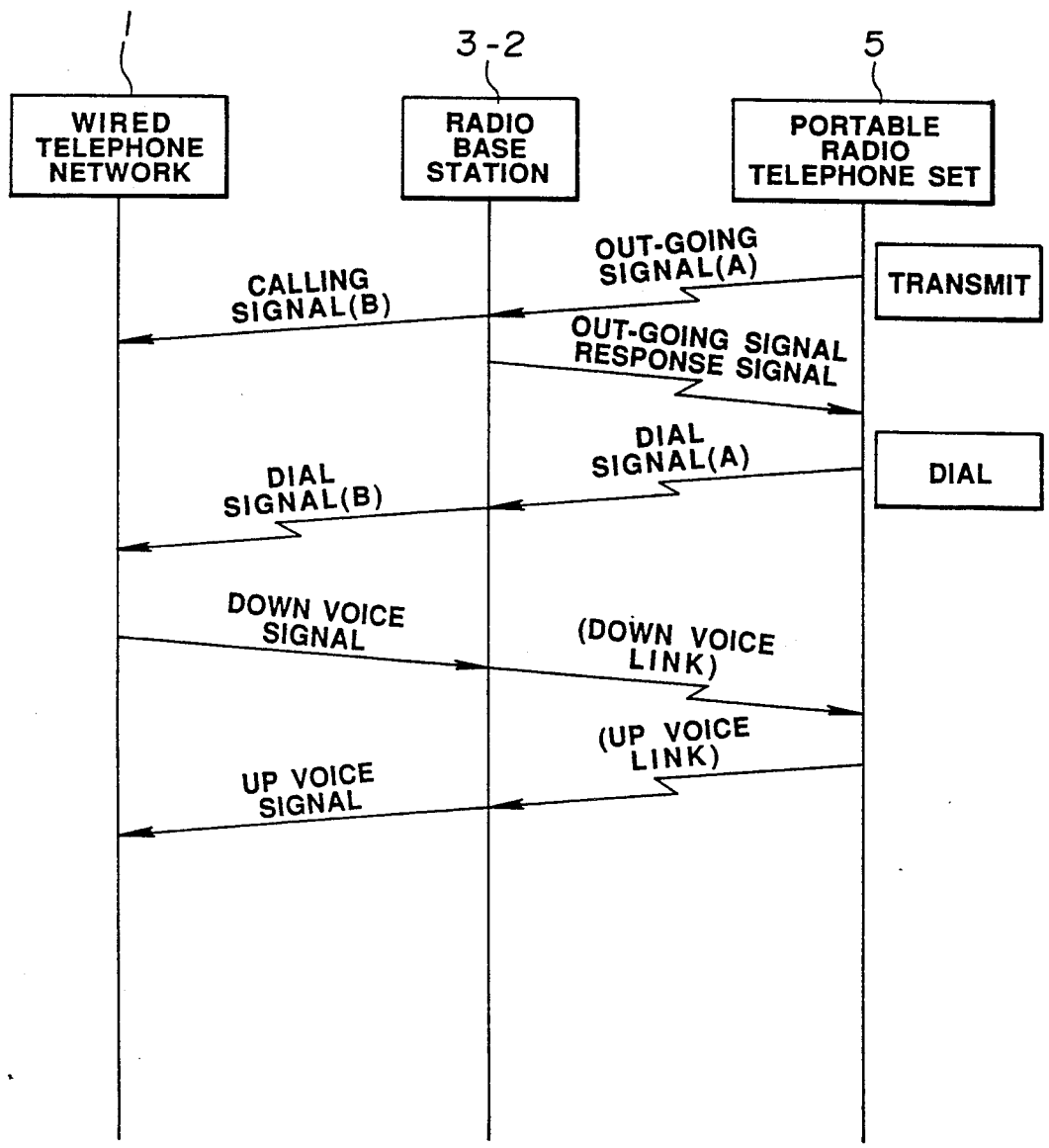
FIG. 6 is a sequence chart for explaining the signal transmitting procedure of the first embodiment.

In order to make clear mutual relationships between the wired network, the radio base station and the portable radio telephone set in the radio communication system, explanation will be made as to the brief calling operation of the portable radio telephone set 5 in connection with FIG. 6.

First, when the portable radio telephone set 5 is put in its on-hook state, the portable radio telephone set 5 transmits a calling signal (A) including an identification code (which will be referred to as the ID code, hereinafter) of the portable radio telephone set 5 through its control channel.

The radio base station 3-2, when receiving the calling signal (A), sends a calling signal (B) including identification data of the radio base station 3-2 and portable radio telephone set 5 to the wired telephone network 1 through the wired line 2-2. The radio base station 3-2, in response to the calling signal (A), also sends a call response signal instructing an idle speech channel to the portable radio telephone set 5 through its control channel and thereafter switches the control channel to the instructed speech channel.

The portable radio telephone set 5, when receiving the call response signal from the radio base station 3-2, switches the control channel to the speech channel indicated by the call response signal and indicates on its display unit the fact that the telephone set 5 is put in its dial-ready state. Under such a condition, when the user of the portable radio telephone set 5 enters the telephone number of a desired party terminal through keying operation, this causes the portable radio telephone set 5 to transmit a dial signal (A) indicative of the telephone number.

The radio base station 3-2, when receiving the dial signal (A), transmits a dial signal (B) indicative of the telephone number to the wired telephone network 1 via the wired line 2-2.

As a result, the party terminal corresponding to the telephone number is called. When the party terminal answers to the dial signal (B), a speech is started therebetween. At this time, a down voice signal from the wired line 2-2 of the wired telephone network 1 is transmitted from the radio base station 3-2 to the portable radio telephone set 5, while an up voice signal transmitted from the portable radio telephone set 5 is transmitted through the radio base station 3-2 to the wired line 2-2 of the wired telephone network 1. When the portable radio telephone set 5 is moved out of the radio zone 4-2 into the radio zone 4-1 and located at a position A therein, the aforementioned calling operation is carried out between the portable radio telephone set 5 and the radio base station 3-1 so that the portable radio telephone set 5 is connected to the wired telephone network 1 through the radio base station 3-1.

The portable radio telephone set 5 can have a communication with the party even when the portable telephone set 5 is located in any of the radio zones 4-1 to 4-3. When the location of the portable radio telephone set 5 is previously known at the time of receiving an incoming signal, however, it is only required that the radio base station of the radio zone where the portable radio telephone set 5 is present transmit the incoming signal, at which time the need for transmitting the incoming signal from the other radio base stations can be eliminated, whereby the effective use of electromagnetic waves can be realized. To this end, in the present embodiment, relationships between the locations (radio zones) of the portable radio telephone sets 5 and their location times are set as a schedule and the presence of the incoming signal is informed to the corresponding portable radio telephone set 5 on the basis of the schedule.

Figure 7:
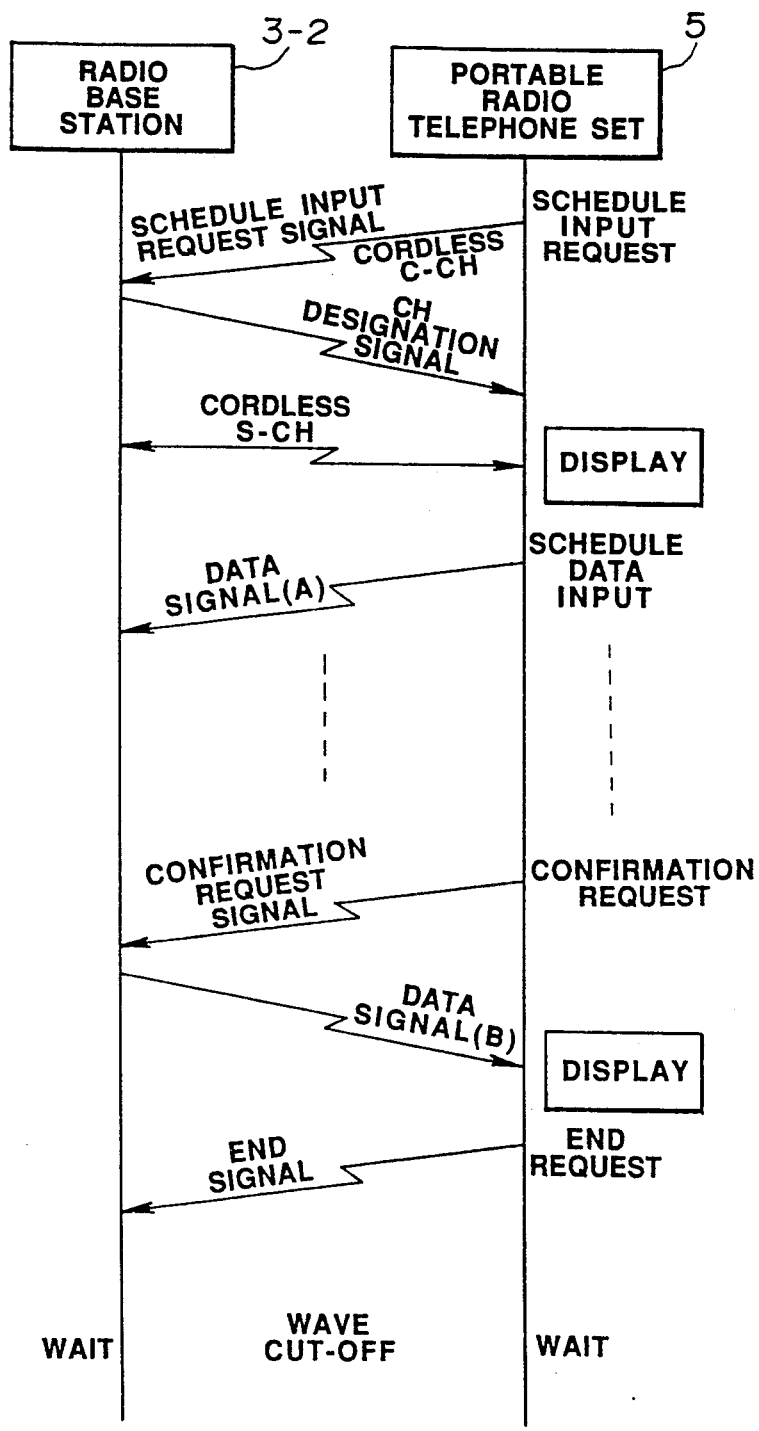
FIG. 7 is a sequence chart for explaining the registering procedure of the first embodiment.

Explanation will first be made as to a procedure for setting the schedule by referring to FIG. 7. In this case, the schedule can be registered through user's keying operation of the portable radio telephone set 5.

At the side of the portable radio telephone set 5, when the user operates the input key board 61 in FIG. 2 in accordance with a predetermined procedure, this causes the radio telephone set 5 to issue a schedule input request. The controller 59, in response to the schedule input request received from the input key board 61, sets the synthesizer 58 at its control channel and also generates a schedule input request signal and sends it to the transmitter 52. As a result, the portable radio telephone set 5 transmits the schedule input request signal on the control channel toward the radio base station 3-2. In this connection, the schedule input request signal contains the ID code of the portable radio telephone set 5 for its discrimination.

At the side of the radio base station 3-2, when the radio circuit 32-1 is, for example, in its wait state, the schedule input request signal issued from the portable radio telephone set 5 is received at the radio circuit 32-1. In the radio circuit 32-1, the received schedule input request signal is demodulated at the receiver 46 into a demodulated signal and then applied to the controller 43. The controller 43 in turn discriminates the ID code contained in the demodulated schedule input request signal, determines the presence of the schedule input request from the portable radio telephone set 5 on the basis of the ID code, and informs the control circuit 36 of the line controller 31 of the ID code and the schedule input request via the data line 31C-1.

The control circuit 36, when accepting the schedule input request, determines that idle speech channel which is not used for any of the radio circuits 32-2 to 32-k and informs the controller 43 of the radio circuit 32-1 of the idle speech channel via the data line 31B-1.

The controller 43, when receiving the information of the idle speech channel from the control circuit 36, generates a channel designation signal indicative of the idle speech channel and sends it to the transmitter 44, from which the channel designation signal is transmitted to the portable radio telephone set 5. Thereafter, the controller 43 switches the synthesizer 47 to the aforementioned speech channel to get ready for communication on the speech channel.

At the side of the portable radio telephone set 5, the received channel designation signal is demodulated at the receiver 56 and then applied to the controller 59. The controller 59 in turn, when receiving the demodulated channel designation signal, identifies the speech channel on the basis of the channel designation signal and sets the synthesizer 58 at the identified speech channel. The controller 58 also indicates on the display 62 the fact that the input of the schedule is possible, since the schedule input request has been accepted.

At this stage, the radio circuit 32-1 of the radio base station 3-2 and the portable radio telephone set 5 have been set at the identical speech channel so that the both can thereafter perform mutual communication on the same speech channel.

Figure 8A:
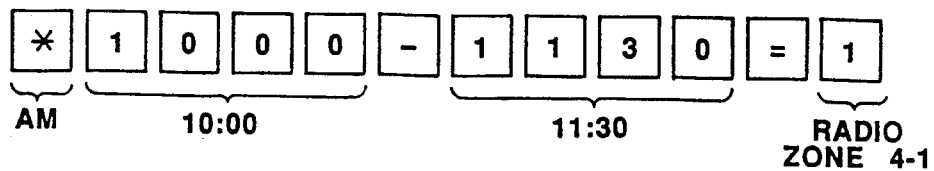
FIGS. 8a-c show an example of the procedure for registering a schedule.
Figure 8B:
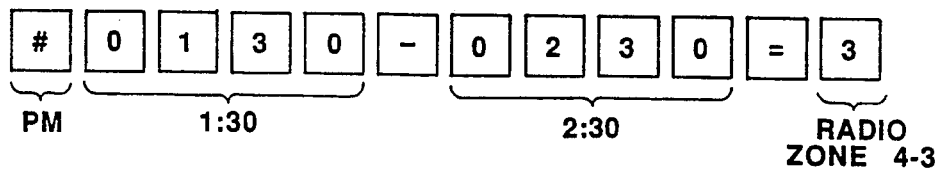
Figure 8C:
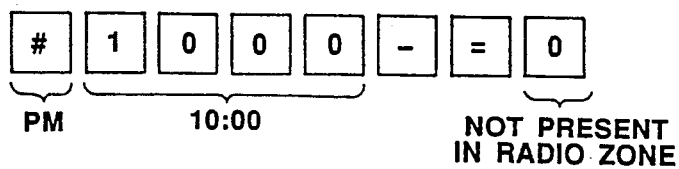

When the user of the portable radio telephone set 5 next conducts such a keying operation on the key input board 61 of the telephone 5 as shown in FIG. 8, this causes the input of the schedule of the portable radio telephone set 5. More specifically, when the user strokes keys on the key input board 61 in accordance with such a procedure as shown in FIG. 8(a), this means that such an input was done that the portable radio telephone set 5 is located in the radio zone 4-1 for a time period between 10 a.m. and 11:30 a.m. When the user strokes keys on the key input board 61 in accordance with such a procedure as shown in FIG. 8(b), this means that such an input was done that the portable radio telephone set 5 is located in the radio zone 4-3 for a time period between 1:30 p.m. and 2:30 p.m. Further, when the user strokes keys on the key input board 61 in accordance with such a procedure as shown in FIG. 8(c), this means that such an input was done that the portable radio telephone set 5 will not respond to any incoming signal for a time period between 10 p.m. and 00:00 a.m. In time bands not shown in the schedule, the portable radio telephone set 5 is supposed to be located in the radio zone 4-2.

In this way, when the schedule is input at the portable radio telephone set 5, the controller 59 creates a data indicative of the schedule, sends a data signal (A) indicative of the schedule data to the transmitter 52, and then transmits it from the transmitter 52.

At the side of the radio base station 3-2, the transmitted data signal (A) is received at the radio circuit 32-1 and then sent to the controller 43. The controller 43, when receiving the data signal (A), transmits the schedule data indicated by the data signal (A) through the data line 31C-1 to the control circuit 36 of the line controller 31.

The control circuit 36, when receiving the schedule data, stores the received schedule data in the memory 37 together with the ID code of the portable radio telephone set 5.

At this stage, the registering operation of the schedule data has been completed. Explanation will next be made as to operation for confirming the contents of the registered schedule.

First, when the user of the portable radio telephone set 5 operates the key input board 61 of the telephone 5 in accordance with a predetermined procedure, this causes the key input board 61 to issue a schedule confirmation request. In response to the schedule confirmation request, the controller 59 generates a confirmation request signal and sends it to the transmitter 52, from which the confirmation request signal is transmitted to the radio base station 3-2.

At the side of the radio base station 3-2, the transmitted confirmation request signal is received at the radio circuit 32-1 and supplied to the controller 43. The controller 43 determines the confirmation request based on the received confirmation request signal and informs the control circuit 36 of the line controller 31 of the confirmation request via the data line 31C-1.

The control circuit 36 responsive to the informed confirmation request reads out the schedule data previously stored in the memory unit 37 together with the ID code of the portable radio telephone set 5 from the memory unit 37, and transmits the read-out schedule data to the controller 43 of the radio circuit 32-1 through the data line 31B-1.

The controller 43 sends the received schedule data to the transmitter 44, which results in that a data signal (B) indicative of the schedule is transmitted from the radio base station 3-2 to the portable radio telephone set 5.

Meanwhile, the portable radio telephone set 5 demodulates the received data signal (B) at the receiver 56 and sends it to the controller 59. The reception of the data signal (B) at the controller 59 causes the schedule of the portable radio telephone set indicated by the data signal (B) to be indicated on the display 62. In this way, the indication of the schedule on the display 62 enables the user of the portable radio telephone set to confirm the registered schedule.

Next, after the user has confirmed the schedule, the user's keying operation of the key input board 61 of the portable radio telephone set 5 in accordance with a predetermined procedure results in that the key input board 61 issues an end signal that in turn is then sent to the transmitter 52 to be transmitted therefrom toward the radio base station 3-2. Thereafter, the controller 59 acts to cut off the radio link of the speech channel and to put the portable radio telephone set 5 in its wait state.

The radio base station 3-2 receives the end signal at the radio circuit 32-1 therein and sends it to the controller 43 therein. The controller 43 determines the end request on the basis of the end signal and cuts off the radio link of the speech channel to put the radio circuit 32-1 in its wait state.

Figure 9:
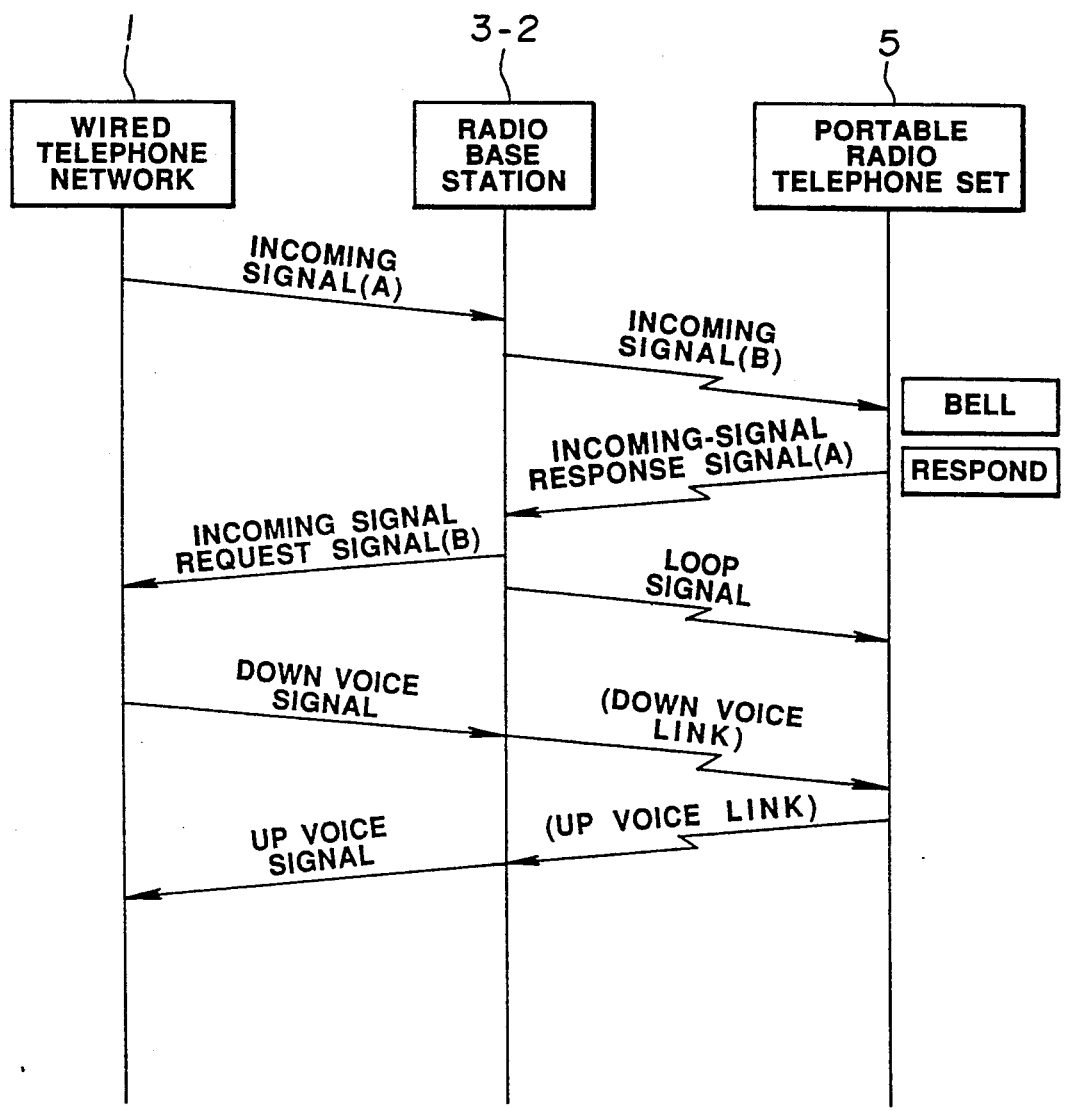
FIGS. 9, 10 and 11 are sequence charts for explaining the procedure for handling of an incoming signal.

Next, explanation will be made by referring to FIG. 9 as to the operation of the system when an incoming signal is transmitted from the wired telephone network 1 to the portable radio telephone set 5 under the condition that the schedule of the portable radio telephone set 5 is already registered. Assume in this case that the portable radio telephone set 5 is present within the radio zone 4-2.

When there is an incoming signal to the portable radio telephone set 5, the wired telephone network 1 informs the radio base station 3-2 of the presence of the incoming signal, because the portable radio telephone set 5 has a telephone number of "012-0019". That is, for example, the incoming signal (A) directed to the portable radio telephone set 5 is sent from the wired telephone network 1 through the wired line 2-2-1 to the line controller 31 of the radio base station 3-2. In this connection, the incoming signal (A) contains the telephone number "012-0019" indicative of the portable radio telephone set 5.

In the radio base station 3-2, the aforementioned incoming signal (A) is applied to the control circuit through the switch circuit 35 of the line controller 31. The control circuit 36, when receiving the incoming signal (A), determines that the incoming signal (A) is the one directed to the portable radio telephone set 5 on the basis of the telephone number "012-0019" contained in the incoming signal (A). And the control circuit 36, after its determination, reads out the schedule of the portable radio telephone set 5 from the memory unit 37. Assume now that, for example, the current time is 9:30 a.m. Then the control circuit 36 determines on the basis of the schedule of FIG. 8 that the portable radio telephone set 5 lies in the radio zone 4-2 and starts controlling the notification of the incoming signal from the radio base station 3-2 to the portable radio telephone set 5.

More in detail, in the radio base station 3-2, when the radio circuit 32-1 for example is in its wait state, the control circuit 36 of the line controller 31 selects the radio circuit 32-1 and sends through the data line 31B-1 to the radio circuit 32-1 an incoming signal (B) containing the ID code of the portable radio telephone set 5 and a channel designation signal indicative of an idle speech channel.

In the radio circuit 32-1, the received incoming signal (B) is received at the controller 43 which in turn applies the received incoming signal (B) to the transmitter 44 to transmit the incoming signal (B) on the control channel. The transmitted incoming signal (B) is received at the portable radio telephone set 5 located in the radio zone 4-2 of the radio base station 3-2.

At the side of the portable radio telephone set 5, the received incoming signal (B) is demodulated at the receiver 56 and then applied to the controller 59. The controller 59 determines on the basis of the ID code contained in the received incoming signal (B) that the incoming signal is the one directed to the portable radio telephone set 5, sounds a sounder (not shown), and indicates the effect of the determination of the incoming signal directed thereto on the display 62 to inform the user of the presence of the incoming signal. Answering to the incoming signal, when the user of the portable radio telephone set 5 turns on a hook button (not shown) provided on the key input board 61, the controller 59 judges that the portable radio telephone set 5 is put in its off-hook state and sends to the transmitter 52 an incoming-signal response signal (A) containing the ID code of the portable radio telephone set 5 to transmit the incoming-signal response signal (A). Thereafter, the controller 59 controls the synthesizer 58 to be previously switched to the speech channel indicated by the channel designation signal contained in the incoming signal (B).

At the side of the radio base station 3-2, the incoming-signal response signal (A) transmitted from the portable radio telephone set 5 is received at the radio circuit 32-1 and then applied to the controller 43. The controller 43, when receiving the incoming-signal response signal (A), informs the control circuit 36 of the line controller 31 via the data line 31C-1 of the fact that the incoming signal was responded to. The controller 43 also switches the synthesizer 47 at the speech channel indicated by the channel designation signal.

The control circuit 36 of the line controller 31, when receiving the notification of the presence of the response to the incoming-signal, sends the incoming-signal response signal (B) to the wired line 2-2-1 through the switch circuit 35, whereby the incoming-signal response signal (B) is transmitted to the wired telephone network 1. And the control circuit 36 controls the switch circuit 35 thereby to realize the exchanging/connecting operation between the wired line 2-2-1 and the speech line 31A-1 and to establish a speech loop with the wired line 2-2-1, which results in a transmission path established between the radio circuit 32-1 and the wired telephone network 1.

Thereafter, the controller 43 of the radio circuit 32-1 supplies a loop signal indicative of the completion of establishment of the speech loop to the transmitter 44 for transmission of the loop signal therefrom to the portable radio telephone set 5.

At the side of the portable radio telephone set 5, the loop signal transmitted from the radio base station 3-2 is demodulated at the receiver 56 and then applied to the controller 59. The controller 59, when receiving the loop signal, determines the completion of establishment of the line loop. And the controller 59 establishes a voice circuit having a path of the handset transmitter 51→transmitter 52→power amplifier 53→antenna duplexer 54→antenna 55 and also having a path of the antenna 55→antenna duplexer 54→receiver 56→handset receiver 57. Thus, the portable radio telephone set 5 is put in such a state that a voice signal can be received and sent.

In this case, a down voice signal from the wired telephone network 1 is transmitted through the wired line 2-2-1 to the radio base station 3-2, from which the down voice signal is further transmitted and received at the portable radio telephone set 5. An up voice signal transmitted from the portable radio telephone set 5, on the other hand, is transmitted from the radio base station 3-2 through the wired line 2-2-1 to the wired telephone network 1. As a result, a speech communication can be realized between the wired telephone network 1 and the portable radio telephone set 5.

Figure 10:
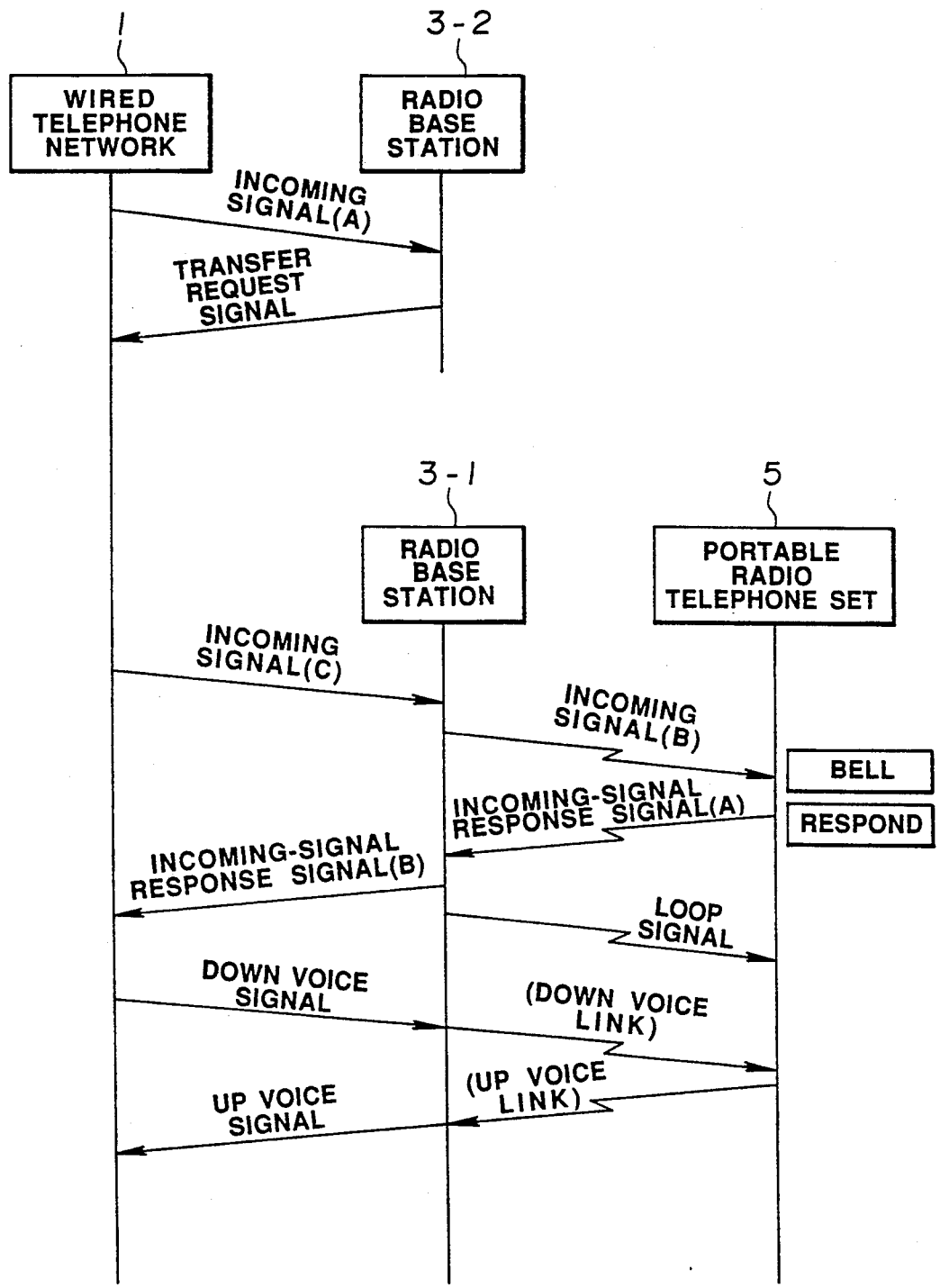

Explanation will then be made as to the operation of the system when the portable radio telephone set 5 is moving from the radio zone 4-2 to the position A of the radio zone 4-1 in accordance with the schedule, for example, at 11:00 a.m., by referring to FIG. 10.

First, in order for the wired telephone network 1 to inform the radio base station 3-2 of the presence of an incoming signal directed to the portable radio telephone set 5, as in the above case, an incoming signal (A) is sent to the radio base station 3-2, for example, through the wired telephone line 2-2

In the radio base station 3-2, the received incoming signal (A) is applied to the controller 36. The controller 36, when receiving the incoming signal (A), determines on the basis of the telephone number "012-0019" contained in the received incoming signal (A) that the received incoming signal is the one directed to the portable radio telephone set 5, and reads out the schedule of the portable radio telephone set 5 from the memory 37. In this case, since the current time is 11:00 a.m as mentioned above, the controller 36 determines that the portable radio telephone set 5 is located in the radio zone 4-1 on the basis of the schedule shown in FIG. 8. When making such determination, the controller 36 will not perform transmission of the incoming signal from the radio base station 3-2 and starts controlling operation for transmission of the incoming signal directed to the portable radio telephone set 5 to the radio base station 3-1 of the radio zone 4-1, since the transmission of the incoming signal from the radio base station 3-2 of the radio zone 4-2 becomes useless. That is, the controller 36 sends to the wired telephone network 1 a transfer request signal for demanding transfer of the incoming signal to the radio base station 3-1. In this connection, the transfer request signal contains the ID code of the portable radio telephone set 5.

Responsive to the transfer request signal, the wired telephone network 1 sends to the radio base station 3-1 an incoming signal (C) indicative of the incoming signal to the portable radio telephone set 5.

The subsequent operation is substantially the same as that explained in connection with FIG. 9. That is, the radio base station 3-1, when responding to the incoming signal (C), transmits an incoming signal (B) to the radio zone 4-1. In response to the incoming signal (B), the portable radio telephone set 5 transmits an incoming-signal response signal (A) to the radio base station 3-1. The radio base station 3-1, when receiving the incoming-signal response signal (A), sends the incoming-signal response signal (B) to the wired telephone network 1 and establishes a speech loop to transmit a loop signal to the portable radio telephone set 5. As a result, a transmission path is established between the portable radio telephone set 5 and the wired telephone network 1 so that up and down voice signals can be transmitted and received through the transmission path to enable a speech therebetween.

In the case where the portable radio telephone set 5 is moving into the radio zone 4-3 in accordance with the schedule and the radio base station 3-2 receives an incoming signal directed to the portable radio telephone set 5 during the movement, the radio base station 3-2 transfers the incoming signal to the radio base station 3-3 of the radio zone 4-3 as in the above case. As a result, the radio base station 3-3 informs the portable radio telephone set 5 of the presence of the incoming signal. And the presence of a response to the incoming signal from the portable radio telephone set 5 enables the realization of a speech channel established therewith.

Explanation will next be made as to the operation of the system when the current time is, for example, 11:00 p.m. and thus the portable radio telephone set 5 fails to respond to an incoming signal according to the schedule of FIG. 8, by referring to FIG. 11.

First, in order that the wired telephone network 1 informs the radio base station 3-2 of, the presence of the incoming signal directed to the portable radio telephone set 5, the wired telephone network 1 sends an incoming signal (A) to the radio base station 3-2.

In the radio base station 3-2, the received incoming signal (A) is applied to the controller 36. The controller 36, when receiving the incoming signal (A), reads out the schedule of the portable radio telephone set 5 from the memory 37. In this case, since the current time is 11:00 p.m. as mentioned above, the controller 36 determines on the basis of the above schedule that the portable radio telephone set 5 failed to answer to the incoming signal. At this time, since even the operation the controller for the incoming signal ends in the useless one, the controller 36 will not perform any control of the incoming signal and transmits an absence signal to the wired telephone network 1.

The wired telephone network 1 will receives the absence signal in place of the incoming-signal response signal or the transfer request signal. The wired telephone network 1, when responding to the absence signal, sends a busy tone or a message indicative of the disabled calling to a subscriber terminal of a caller.

Figure 11:
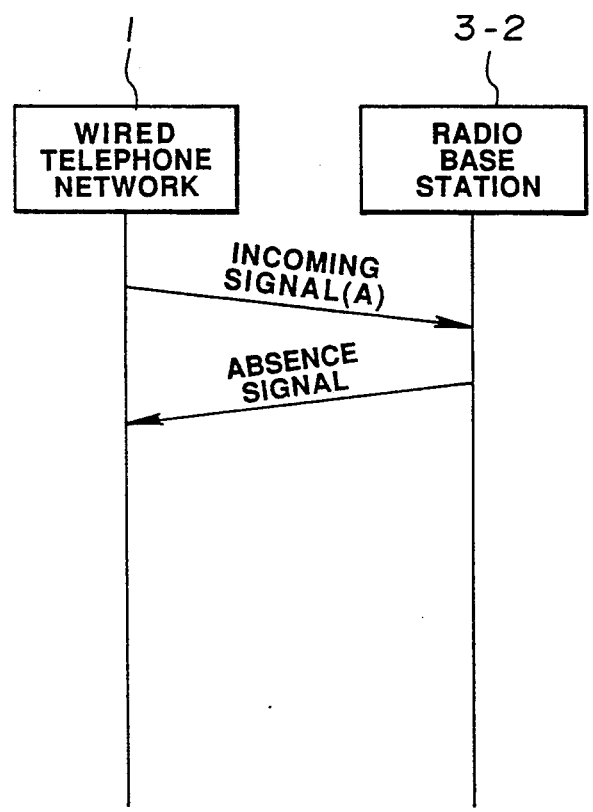

When the portable radio telephone set 5 is not located in any of the radio zones 4-1 to 4-3 or when the portable radio telephone set 5 fails to answer to an incoming signal, any of the radio base stations 3-1 to 3-3 fails to receive the incoming-signal response signal from the portable radio telephone set 5, so that substantially the same operation as in FIG. 11 is carried out.

In this way, the schedule of the portable radio telephone set 5 is previously registered, the system can determines one of the radio zones where the portable radio telephone set 5 is present on the basis of the schedule at the time of receiving an incoming call. As a result, the need for transmitting the incoming signal respectively from all the radio base stations can be removed and transmission of the incoming signal only from one radio base station is required, whereby the effective use of electromagnetic waves can be realized.

Although the times and radio zones have been associated with each other in the schedule in the illustrated embodiment, a schedule showing relationships between dates and radio zones may be used as necessary. When the portable radio telephone set is moved into another radio zone after several hours from the current time, a schedule showing relationships between time elapses and radio zones may be employed.

Further, such a service function may be provided that a plurality of names for places in the respective radio zones are previously set and when a predetermined one of the place names is entered, one of the radio zones including the predetermined place name can be identified and the identified radio zone can be automatically registered.

Also, when the portable radio telephone set 5 is moved into another radio zone that is completely different from the respective radio zones 4-1 to 4-3, the user of the portable radio telephone set 5 must register the telephone number of the portable radio telephone set 5 for that radio zone. In this connection, the system may be arranged so that registration of the schedule of the portable radio telephone set 5 may be realized together with the realization of the registration of the telephone number of the portable radio telephone set 5.

Furthermore, predetermined ones of the radio circuits 32-1 to 32-k may be used as exclusive control channels and the other radio circuits may be used as exclusive speech channels, in which case the radio circuits 32-1 to 32-k are used differently in their proper manners depending on whether the communication with the portable radio telephone set is based on the control channel or based on the speech channel. In addition, the control channels of respectively different frequencies may be provided for the radio zones 4-1 to 4-3 and these radio zones may be overlapped so that the respective radio base stations 3-1 to 3-3 can perform their own communications on their control channels at the same time.

The channel designation signal to be transmitted from the radio base station may contain time data. Time based on the time data may be displayed at the portable radio telephone set 5 so that the time used as the reference time of the radio base station can be provided to the user of the portable radio telephone set.

Figure 12:
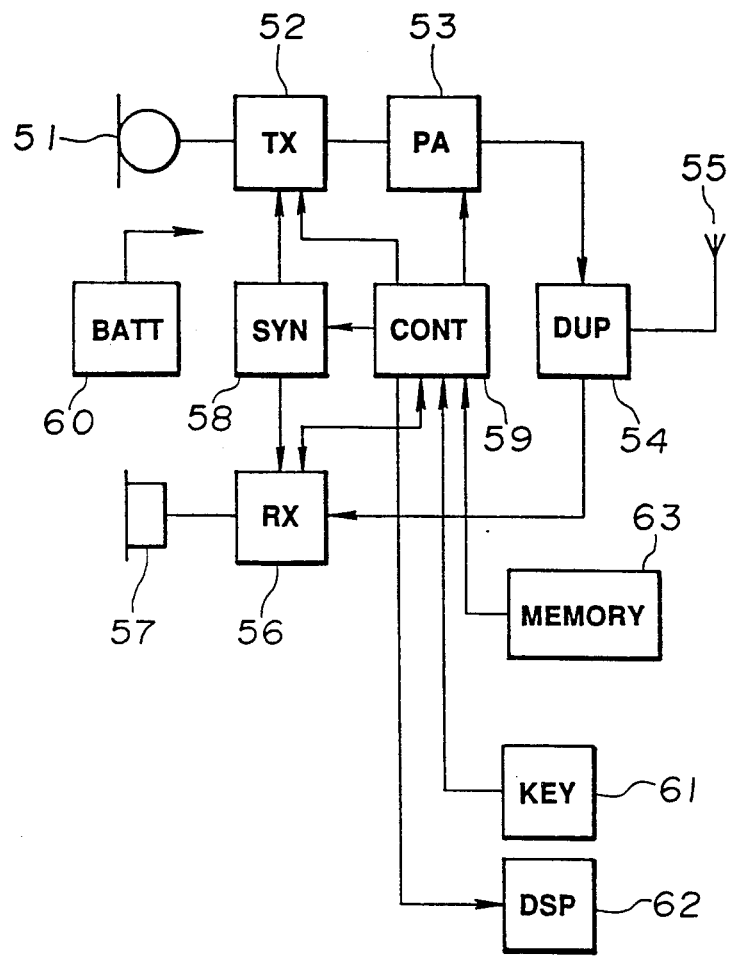
FIG. 12 is a block diagram of a portable radio telephone set used in a radio communication system in accordance with a second embodiment of the present invention.

FIG. 12 is a block diagram of a radio communication system in accordance with a second embodiment of the present invention, in which a memory 63 is newly added to the arrangement of the portable radio telephone set 5 of FIG. 2. As the memory 63, a random access memory for example is used. The operation of the system when registering a schedule with use of the portable radio telephone set 5 having such an arrangement as shown in FIG. 12 will be detailed below with reference to FIG. 13.

First of all, when the user of the portable radio telephone set 5 operates the key input board 61 of the portable radio telephone set 5 in accordance with a predetermined procedure, this causes a schedule registration request to be entered into the portable radio telephone set 5. The controller 59, in response to the schedule registration request, causes a message indicative of registration permission to be indicated on the display 62, whereby the schedule registering operation of the user is prompted.

After the message is displayed, the user operates the key input board 61 in the same manner as the procedure of FIG. 8 to enter the schedule of the portable radio telephone set 5, this causes the controller 59 to store in the memory 63 a data indicative of the schedule and also to display the schedule on the display 62. At this time, if the user erroneously enters the schedule through erroneous keying strokes, then the user repeats the entering operation while confirming the contents indicated on the display 62.

When the desired schedule has been entered in this way, the user subsequently strokes keys on the key input board 61 in accordance with a predetermined procedure to provide a schedule input request. In response to the schedule input request, the controller 59 generates a schedule input request signal containing the ID code of the portable radio telephone set 5. And the schedule input request signal is transmitted from the portable radio telephone set 5 on the control channel.

At the side of the radio base station 3-2, the schedule input request signal is received, for example, at the radio circuit 32-1 which in turn informs the line controller 31 of the schedule input request from the portable radio telephone set 5. The line controller 31, when answering to the input request, informs the radio circuit 32-1 of an idle speech channel. The radio indicative 32-1 transmits a channel designation signal indicative of the above idle speech channel on the control channel and then switches the control channel to the idle speech channel.

In the portable radio telephone set 5, the controller 59, when receiving the speech channel designation signal, switches the control channel to the speech channel indicated by the designation signal and then reads out the schedule data from the memory 63 for transmission of the read-out schedule data. As a result, the portable radio telephone set 5 transmits a data signal (B) indicative of the schedule data.

In the radio base station 3-2, the data signal (B) is received at the radio circuit 32-1 which in turn informs the line controller 31 of the schedule data indicated by the data signal (B). The line controller 31 stores the schedule data in the memory 37 and further reads out the schedule data from the memory 37 to return it to the radio circuit 32-2. The radio circuit 32-2, when receiving the notification of the schedule data from the line controller 31, transmits a data signal (C) indicative of the schedule data.

When the portable radio telephone set 5 receives the data signal (C), the received data (C) is applied to the controller 59 therein. The controller 59, when receiving the data signal (C), causes the schedule to be indicated on the display 62 on the basis of the schedule data indicated by the data signal (C). At this time, when the schedule displayed on the display 62 is the same as the schedule entered through the previous input operation, this means that the schedule has been surely registered in the radio base station 3-2. Therefore, when the user operates the key input board 61 in accordance with a predetermined collation end procedure, a collation end is entered to the portable radio telephone set. In response to the collation end, the portable radio telephone set 5 transmits a collation end signal and thereafter cuts off the radio link of the speech channel to return the portable radio telephone set 5 to its wait state.

When the radio base station 3-2 receives the collation end signal, the received collation end signal is applied to the radio circuit 32-1. The radio circuit 32-1, when receiving the collation end signal, cuts off the radio link of the speech channel and also informs the line controller 31 of the collation end. The line controller 31 determines the completion of registration of the schedule of the portable radio telephone set 5 on the basis of the notification from the radio circuit 32-1 and subsequently holds the schedule data in the memory 37.

When the schedule data indicated on the display 62 of the portable radio telephone set 5 is determined not to be the same as the schedule specified at the portable radio telephone set 5 on the basis of the data signal (C) received from the radio base station 3-2, the user operates the key input key board 61 in accordance with a predetermined procedure to again transmit the schedule data in the memory 63 of the portable radio telephone set 5 to the radio base station 3-2. The radio base station 3-2, when again receiving the schedule data, stores it in the memory 37 of the line controller 31 in place of the schedule data already stored in the memory 37, and thereafter transmits a data signal (C) indicative of the schedule data newly stored in the memory 37. And the portable radio telephone set 5, when receiving the data signal (C), again indicates the schedule based on the received data signal (C) on the display 62 to renew the display contains thereon. At this time, if the displayed schedule is wrong, then the user again operates the portable radio telephone set 5 to again transmit the schedule of the memory 63 from the portable radio telephone set 5; whereas, if the displayed schedule is right, then the user operates the portable radio telephone set 5 to transmit a collation end signal from the portable radio telephone set 5. The repetition of such operation enables the reliable registration of a desired schedule data in the radio base station 3-2 without any error.

In this way, when the radio communication system is arranged so that a schedule data is once stored in the memory 63 of the portable radio telephone set 5 and so that the stored schedule data is transmitted from the portable radio telephone set 5 to the radio base station 3-2, the need for establishing a radio link of a speech channel between the portable radio telephone set 5 and the radio base station 3-2 can be eliminated during the entering operation of the schedule data and the establishment of the radio link is required only after the schedule is once stored and the schedule data in the memory 63 of the portable radio telephone set 5 can be transmitted to the radio base station 3-2 in a short time, thus advantageously resulting in the realization of effective use of electromagnetic waves. In addition, since schedule data stored in the radio base station 3-2 is returned to the portable radio telephone set 5 to confirm whether or not the schedule data has been reliably registered without any error, even when the communication quality of the radio link is reduced under the influence of, e.g., phasing to cause a data transmission error, it can be avoided that the schedule data is erroneously registered.

Figure 14:
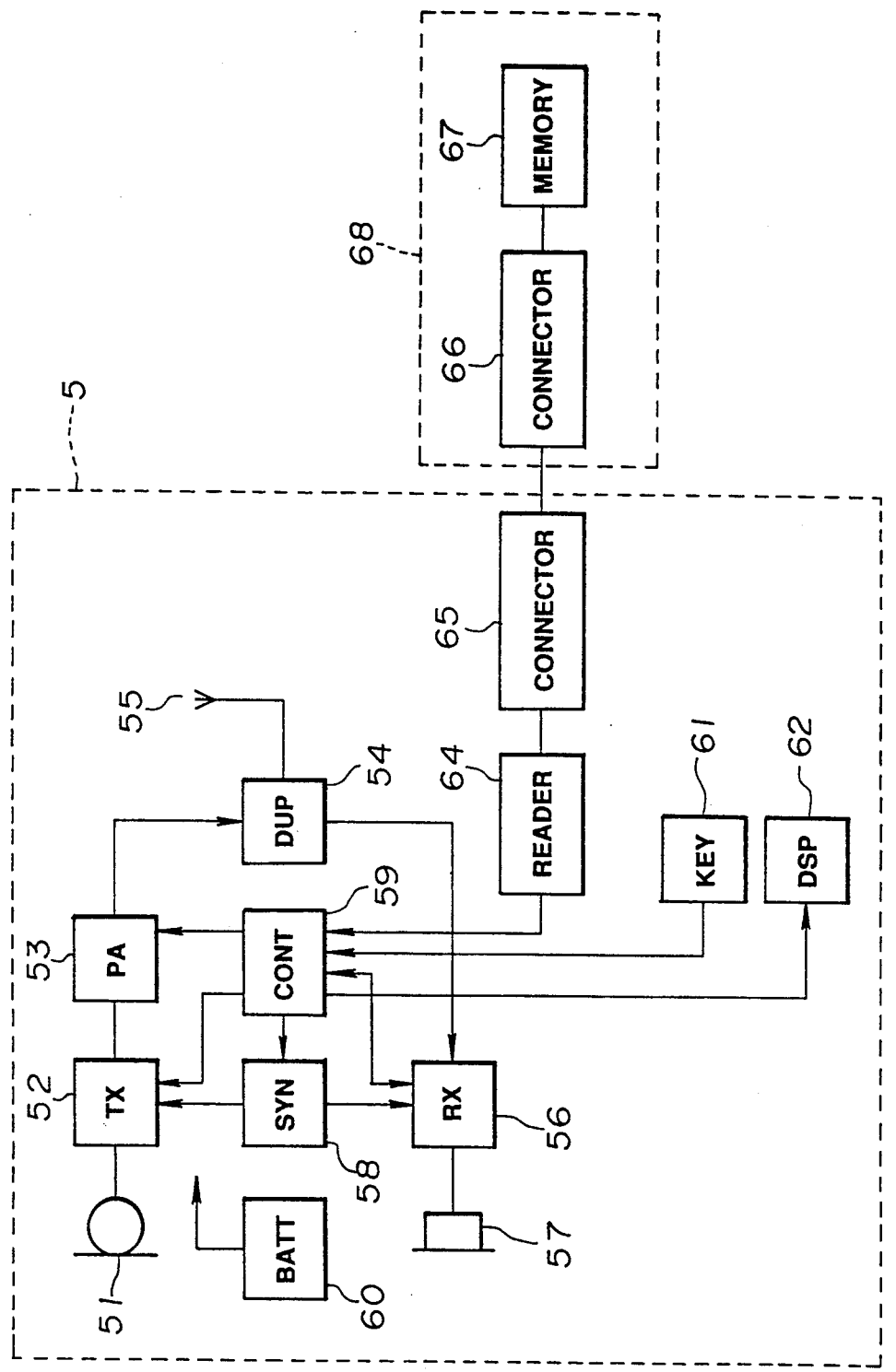
FIG. 14 is a block diagram of a portable radio telephone set used in a radio communication system in accordance with a third embodiment of the present invention.

FIG. 14 is a block diagram of a radio communication system in accordance with a third embodiment of the present invention.

In the present embodiment, a reader 64, a first connector 65 connected to the reader 64, and an external memory unit 68 having a second connector 66 and a memory 67 connected to the second connector 66 are newly added to the arrangement of FIG. 2.

The external memory unit 68 may be, for example, an IC card and the schedule data of the portable radio telephone set 5 is previously stored in the built-in memory 67. The previous storage of the schedule data may be carried out, for example, by connecting the external memory unit 68 to a personal computer and sending the schedule data to the memory 67 of the external memory unit 68 through the personal computer. Further, a data other than the schedule data may be stored in the external memory unit 68, in which case the external memory unit 68 is used to perform multi-purpose functions.

In operation, when the external memory unit 68 is connected at its second connector 66 with the first connector 65 of the portable radio telephone set 5, the memory 67 of the external memory unit 68 is connected with the reader 64 of the portable radio telephone set 5.

Under this condition, when the user operates the key input board 61 of the portable radio telephone set 5 in accordance with a predetermined procedure to issue a schedule registration request, the controller 59 is caused to activate the reader 64. The reader 64 loads the schedule data of the portable radio telephone set 5 from the memory 67 of the external memory unit 68 to apply the schedule data to the controller 59. The controller 59 once stores the received schedule data in the built-in memory (not shown) and also indicates the schedule on the display 62. At this time, when the user operates the key input board 61 to modify the displayed schedule, the controller 59 is caused to renew the schedule data on the basis of the modification.

Figure 13:
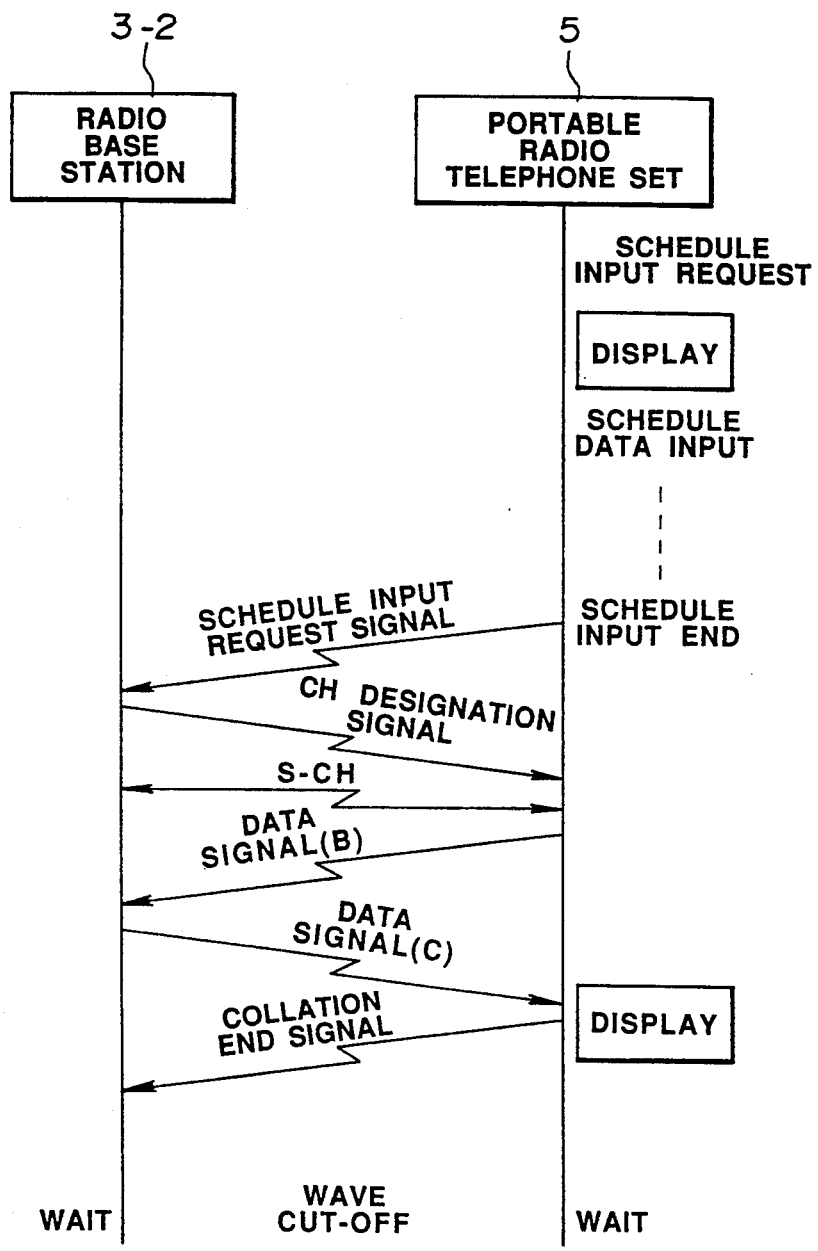
FIG. 13 is a sequence chart for explaining a schedule registering procedure in the second embodiment.

Thereafter, the user strokes keys on the key input board 61 in accordance with a predetermined procedure to issue a schedule input request, a schedule input request signal is transmitted from the portable radio telephone set 5 and the radio base station 3-2 in response to the received schedule input request signal transmits a channel designation signal as in FIG. 13. As a result, a speech channel radio link is established between the portable radio telephone set 5 and the radio base station 3-2 so that the controller 59 of the portable radio telephone set 5 sends to the transmitter 52 the data signal (B) indicative of the schedule data previously received from the reader 64 and stored therein. The subsequent operation of the system is substantially the same as that in FIG. 13. That is, the transmission and reception of the data signal (C) and the collation end signal are carried out between the portable radio telephone set 5 and the radio base station 3-2 so that the schedule data is registered in the memory 37 of the line controller 31 of the radio base station 3-2. With respect to the registration, it goes without saying that the registered schedule data can be confirmed at the portable radio telephone set 5 and the registered schedule data can be modified.

In this way, when the schedule data is previously stored in the external memory unit 68, the registering operation of the schedule data can be highly simplified. Further, various sorts of schedule data may be previously registered in the external memory unit 68 and desired one of the previously stored schedule data may be selected.

Figure 15:
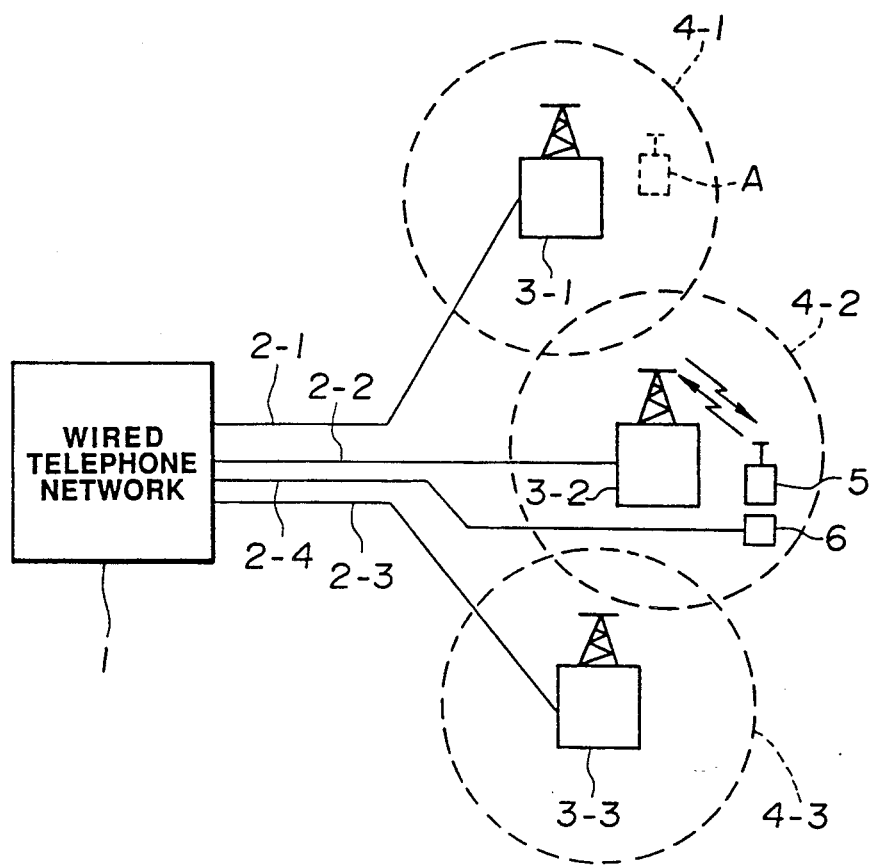
FIG. 15 is a block diagram of a radio communication system in accordance with a fourth embodiment of the present invention.

Referring to FIG. 15, there is shown a block diagram of a radio communication system in accordance with a fourth embodiment of the present invention.

In the present embodiment, the wired telephone network 1 shown in FIG. 1 has a wired line 2-4 connected with a wired terminal 6, in addition to the arrangement of FIG. 1. The wired terminal 6 is, for example, a personal computer which is disposed at such a position that the user of the portable radio telephone set 5 can use the computer in the radio zone 4-2.

The illustrated embodiment is arranged so that the wired terminal 6 calls the radio base station 3-2 through the wired telephone network 1 and transmits the schedule of the portable radio telephone set 5 to the radio base station 3-2 through the wired telephone network 1 to register the schedule in the radio base station 3-2, which operation will be described in the following paragraphs.

First, the user of the wired terminal 6 puts the terminal in its off-hook state and enters the telephone number of the radio base station 3-2, for example, "012-0000". This causes a dial signal indicative of the entered telephone number to be sent from the wired terminal 6 to the wired telephone network 1 which in turn calls the radio base station 3-2.

The line controller 31 of the radio base station 3-2 in response to the calling operation connects the wired line 2-2 to the controller 36 through the switch circuit 35. This means that an interconnection is realized between the wired terminal 6 and the control circuit 36 of the line controller 31 through the wired telephone network 1.

When a communication is realized between the wired terminal 6 and the radio base station 3-2 in this way, the personal computer as the wired terminal 6 transmits the schedule data together with the ID code of the portable radio telephone set 5.

The control circuit 36 of the line controller 31 in the radio base station 3-2, when receiving the ID code and the schedule data, stores these in the memory 37, at which stage the registration of the schedule of the portable radio telephone set 5 is completed.

On transmitting the ID code from the wired terminal 6, the ID code may be previously stored in an IC card so that the ID code is read out from the IC card inserted in the reader attached to the personal computer to be automatically transmitted. Although the wired terminal 6 is located at a predetermined position within the radio zone 4-2 in the illustrated embodiment, it goes without saying that the location of the wired terminal 6 is not limited to the illustrated example but may be located at a position away from the radio zone 4-2.

Further, both the registration of the schedule from the wired terminal 6 to the radio base station and the registration of the schedule from the portable radio telephone set 5 to the radio base station may be employed.

Figure 16:
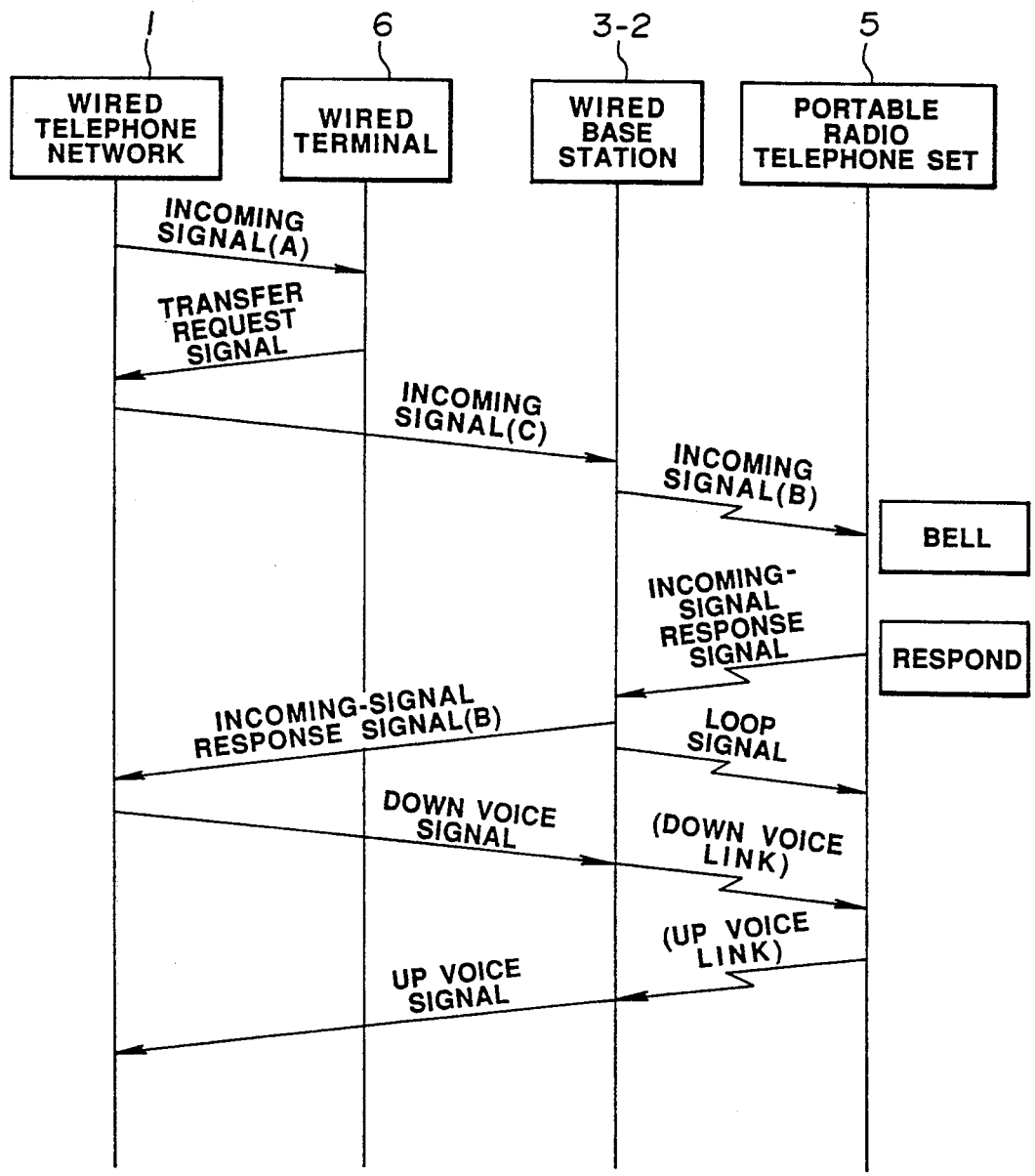
FIG. 16 is a sequence chart for explaining an incoming-signal handling procedure in a radio communication system in accordance with a fifth embodiment of the present invention.

A fifth embodiment of the radio communication system of the present invention will be detailed by referring to FIG. 16.

In the present embodiment, the schedule of the portable radio telephone set 5 is previously registered in the wired terminal 6 in FIG. 15 so that, when there is an incoming signal which is to be sent from the wired telephone network 1 to the portable radio telephone set 5, the wired telephone network 1 once calls the wired terminal 6. The wired terminal 6, when called, determines, on the basis of the schedule, one of the radio zones where the portable radio telephone set 5 is located, and transfers the call to the determined radio zone.

The more detailed operation will be explained by referring to FIG. 16.

First, when the portable radio telephone set 5 receives an incoming signal, the telephone number of the portable radio telephone set 5 is required to be previously given to the wired terminal 6 in order for the wired telephone network 1 to call the wired terminal 6. To this end, a transfer destination telephone number in place of the telephone number is previously given to the portable radio telephone set 5.

Since the telephone number of the portable radio telephone set 5 is given to the wired terminal 6, in the case where there is present an incoming signal corresponding to the telephone number, the wired telephone network 1 sends the incoming signal (A) to the wired terminal 6. The wired terminal 6, when receiving the incoming signal (A), determines on the basis of the previously registered schedule one of the radio zones 4-1 to 4-3 where the portable radio telephone set 5 lies. The wired terminal 6, when determining the location of the portable radio telephone set 5, for example, in the radio zone 4-2, transmits to the wired telephone network 1 a transfer request signal indicative of a transfer to the radio base station 3-2.

The wired telephone network 1, when receiving the transfer request signal, transmits the incoming signal (C) to the radio base station 3-2 belonging to the radio zone 4-2. The radio base station 3-2, when receiving the incoming signal (C), transmits the incoming signal (B). At this time, when the portable radio telephone set 5 is located in the radio zone 4-2, the portable radio telephone set 5 receives the incoming signal (B) and informs of the presence of the incoming signal. Responsive to the incoming signal, the portable radio telephone set 5 transmits the incoming-signal response signal (A) that is received at the radio base station 3-2. The radio base station 3-2, when receiving the incoming-signal response signal (A), transmits the incoming-signal response signal (B) to the wired telephone network 1 and also transmits a loop signal to the portable radio telephone set 5.

After the foregoing operation, a communication state is obtained between the portable radio telephone set 5 and the wired telephone network 1 to start the speech therebetween.

In this way, when the radio communication system is arranged so that the schedule of the portable radio telephone set 5 is previously registered in the wired telephone network 1 and an incoming signal received at the wired terminal 6 is transferred to the portable radio telephone set 5 on the basis of the schedule, the present invention can be carried out without provision of any new function to the wired telephone network, radio base station and portable radio telephone set.

In this connection, the transfer destinations include not only the portable radio telephone set 5 but also other portable radio telephone sets and other wired terminals to transfer the incoming signal to the wired terminal 6 as distributed to these telephone sets or wired terminals.

Figure 17:
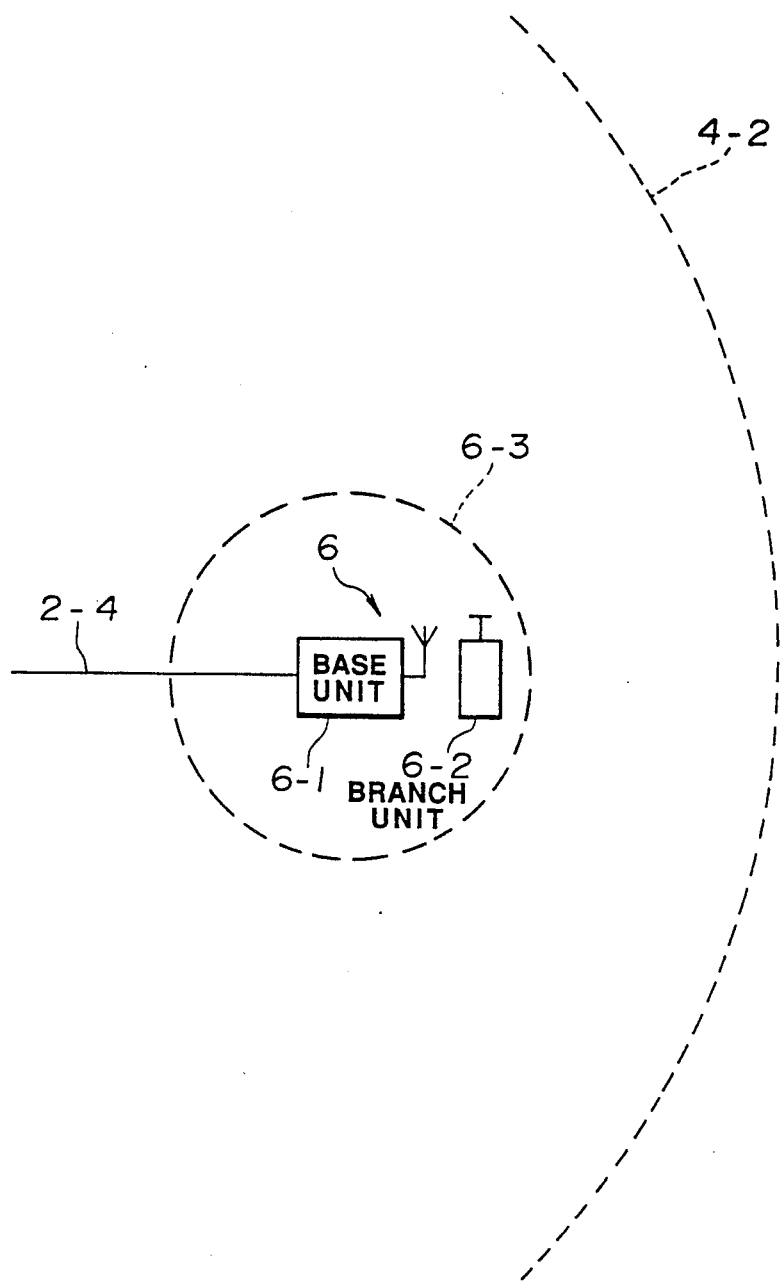
FIG. 17 is a block diagram showing a cordless telephone set used in a radio communication system in accordance with a sixth embodiment of the present invention.

FIG. 17 shows a block diagram of a radio communication system in accordance with a sixth embodiment of the present invention.

In the present embodiment, a cordless telephone set is used in place of the wired terminal 6 in FIG. 15. The cordless telephone set 6 comprises a base unit 6-1 connected to the wired telephone network 1 through the wired line 2-4 and a branch unit 6-2 coupled with the base unit 6-1 via a radio link. The branch unit 6-2 has substantially the same structure as the portable radio telephone set 5 of FIG. 2 except that the amplification factor of the power amplifier is adjusted by the controller 59. Through proper adjustment of the amplification factor, the transmission output of the branch unit 6-2 can be set large or small. When the transmission output of the branch unit 6-2 is set small, the branch unit 6-2 is coupled with the base unit 6-1 through a radio link in a radio zone 6-3 of the base unit 6-1 that is smaller in size than the radio zone 4-2 of the radio base station 3-2 so that the user can communicate with the wired telephone network 1 through the base unit 6-1. When the transmission output of the branch unit 6-2 is set large, on the other hand, the branch unit 6-2 is coupled with the radio base station 3-2 through the radio link in the radio zone 4-2 of the radio base station 3-2 so that the user can communicate with the wired telephone network 1 through the radio base station 3-2, in which case the same communication as for the portable radio telephone set 5 can be realized.

Figure 18:
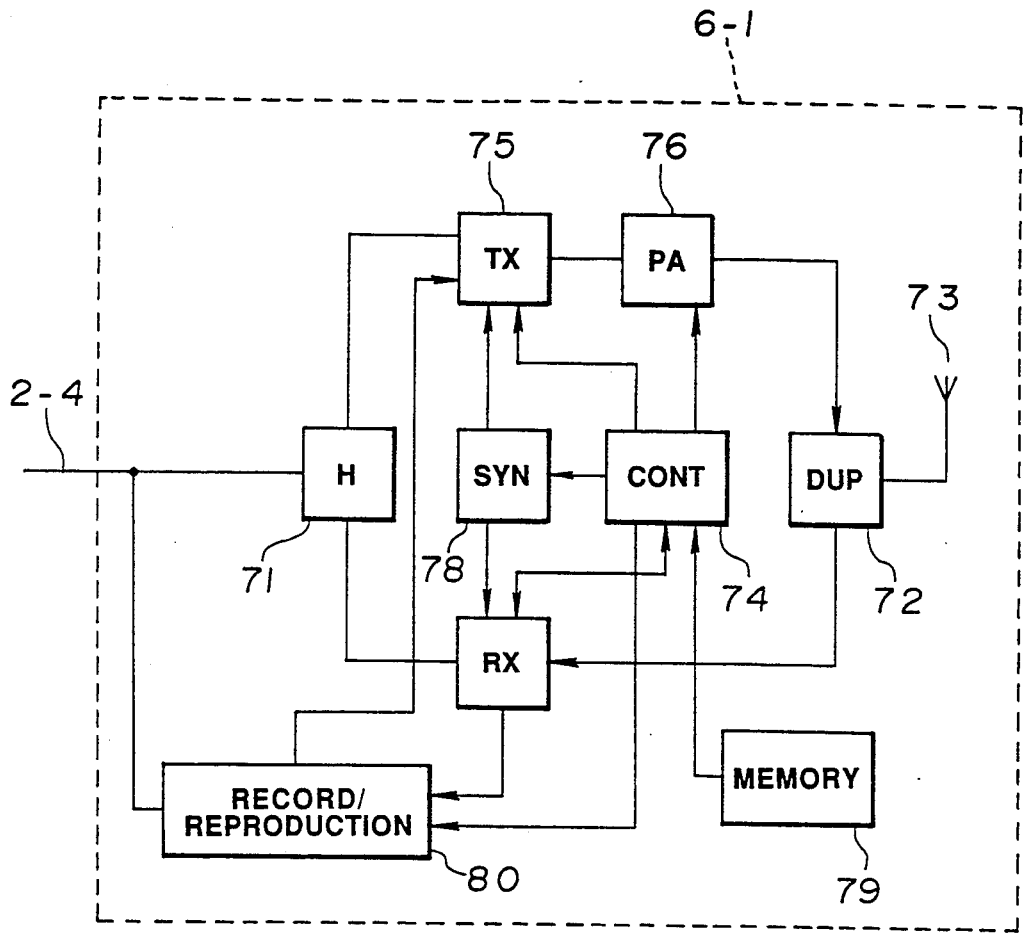
FIG. 18 is a block diagram of a base unit used in the sixth embodiment.

The base unit 6-1 is arranged as shown in FIG. 18. In the drawing, a hybrid circuit 71 is connected to the wired line 2-4 and an antenna duplexer 72 is connected to an antenna 73. A voice signal received from the wired line 2-4 through the hybrid circuit 71 as well as a data signal issued from a controller 74 are supplied to a transmitter 75 as its modulation inputs to be modulated therein. A modulated signal issued from the transmitter 75 is amplified at a power amplifier 76 and then sent through the antenna duplexer 72 to the antenna 73, from which the modulated signal is transmitted in the form of electromagnetic down waves. Meanwhile, when electromagnetic up waves are received at the antenna 73 as a received input, the received input is sent therefrom through the antenna duplexer 72 to a receiver 77. The receiver 77 sends a voice signal as one of its demodulated outputs to the wired line 2-4 through the hybrid circuit 71 and applies a data signal as the other demodulated output to the controller 74. A synthesizer 78 sends a frequency signal corresponding to the radio channel being used to the transmitter 75 and the receiver 77. A memory circuit 79 is provided to store various sorts of data therein. A recorder/reproducer 80 is used to record and reproduce the voice signal. The controller 74 performs general control over the base unit 6-1.

With the cordless telephone system having such an arrangement as mentioned above, since the frequency band of the radio link used for radio communication between the base and branch units 6-1 and 6-2 is set to be out of the frequency band of the frequency band of the radio link used for radio communication between the radio base station 3-2 and the branch unit 6-2, both radio communications can be prevented from being interfered with each other.

Figure 19:
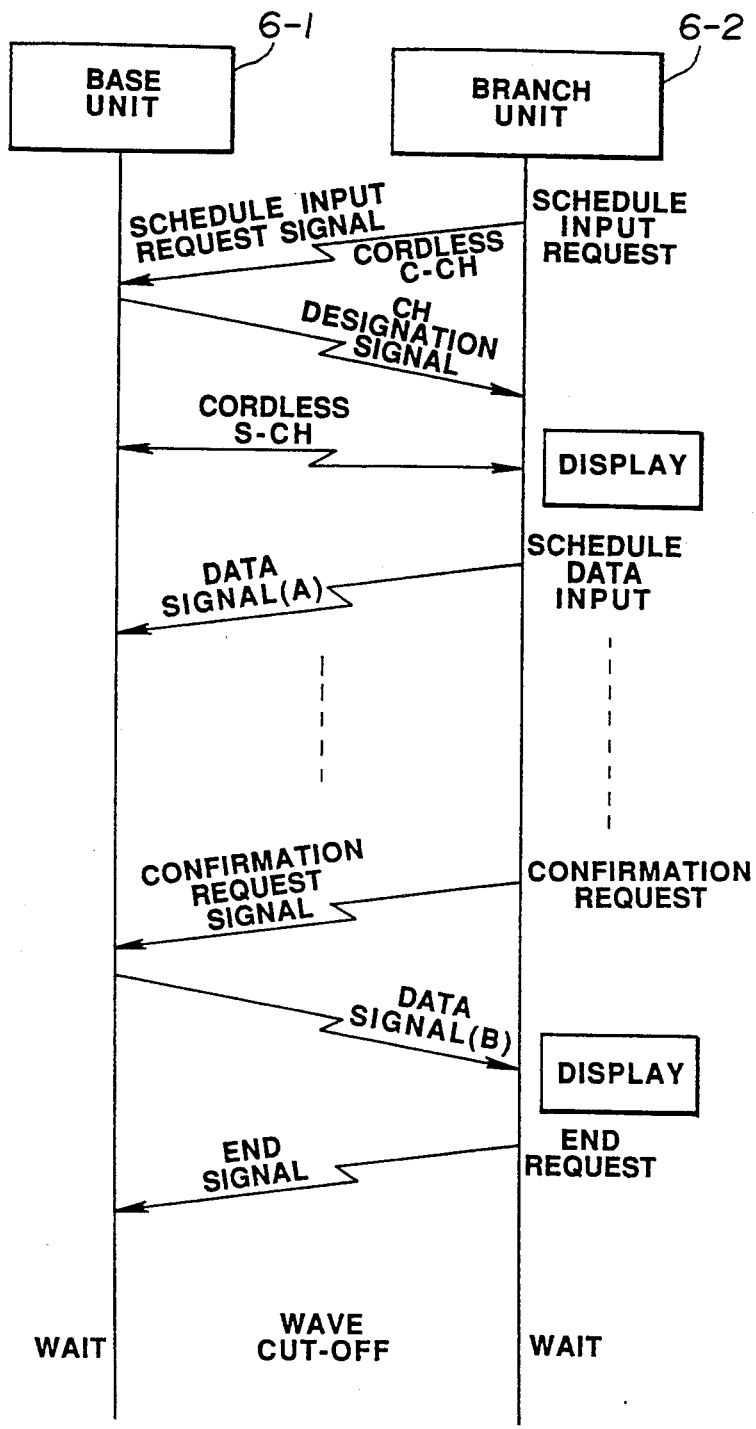
FIG. 19 is a sequence chart for explaining a registering procedure in the sixth embodiment.

In the present embodiment, a schedule of the branch unit 6-2 is registered in the memory 79 of the base unit 6-1. This registering operation will be explained in connection with FIG. 19.

First, when user's operation of the key input board of the branch unit 6-2 in accordance with a predetermined procedure causes the key input board to issue a schedule input request, the branch unit 6-2 transmits a schedule input request signal to the base unit 6-1 on the control channel. In this connection, the schedule input request signal contains a cordless ID code given to the branch unit 6-2 and the cordless ID code is different from the ID code used for the communication between the branch unit 6-2 and the radio base station.

In response to the received schedule input request signal, the base unit 6-1 transmits a channel designation signal indicative of an idle speech channel to the branch unit 6-2. In this case, the base and branch units 6-1 and 6-2 switch their control channel to the idle speech channel respectively, after which a speech is carried out based on the idle speech channel. At this time, a display provided on the branch unit 6-2 indicates the fact that the system is ready for a schedule to be input.

Next, when the user of the cordless telephone set operates the key input board of the branch unit 6-2 to enter the schedule of the branch unit 6-2, the branch unit 6-2 transmits a data signal (A) indicative of the schedule data to the base unit 6-1.

The base unit 6-1, when receiving the schedule data, the controller provided in the base unit 6-1 stores the received schedule data in the memory 79.

When the user then strokes keys on the key input board of the branch unit 6-2 in accordance with a predetermined procedure to issue a registered-schedule confirmation request, the branch unit 6-2 transmits a confirmation request signal to the base unit 6-1.

When the base unit 6-1 receives the confirmation request signal, the controller 74 provided in the base unit 6-1 reads out the schedule data previously stored in the memory 79 therefrom and sends a data signal (B) indicative of the read-out schedule data to the transmitter 75 for transmission of the data signal (B) therefrom.

The branch unit 6-2, when receiving the data signal (B), indicates the schedule on the display thereof on the basis of the schedule data indicated by the received data signal (B). When the user confirms the schedule indicated on the display and then operates the key input board in accordance with a predetermined procedure, the branch unit 6-2 transmits an end signal to the base unit 6-1, whereby the radio link between the branch and base units 6-2 and 6-1 is cut off.

The thus-registered schedule of the branch unit 6-2 contains the radio zones 4-1 to 4-3 of the radio base stations 3-1 to 3-3 where the branch unit 6-2 can be located and the radio zone 6-3 of the base unit 6-1. When the branch unit 6-2 is located in any one of the radio zones 4-1 to 4-3 in accordance with the schedule, an incoming signal received from the wired telephone network 1 and to be directed to the base unit 6-1 is transferred or forwarded in the same manner as in the procedure of FIG. 16. More specifically, the base unit 6-1 determines on the basis of the schedule one of the radio zones where the branch unit 6-2 is located and sends to the wired telephone network 1 a transfer request signal indicative of the radio base station of the determined radio zone. As a result, the incoming signal is sent to the radio base station of the radio zone where the branch unit 6-2 is present so that, when the branch unit 6-2 responds to the incoming signal, a speech can be started through the radio base station.

Figure 20:
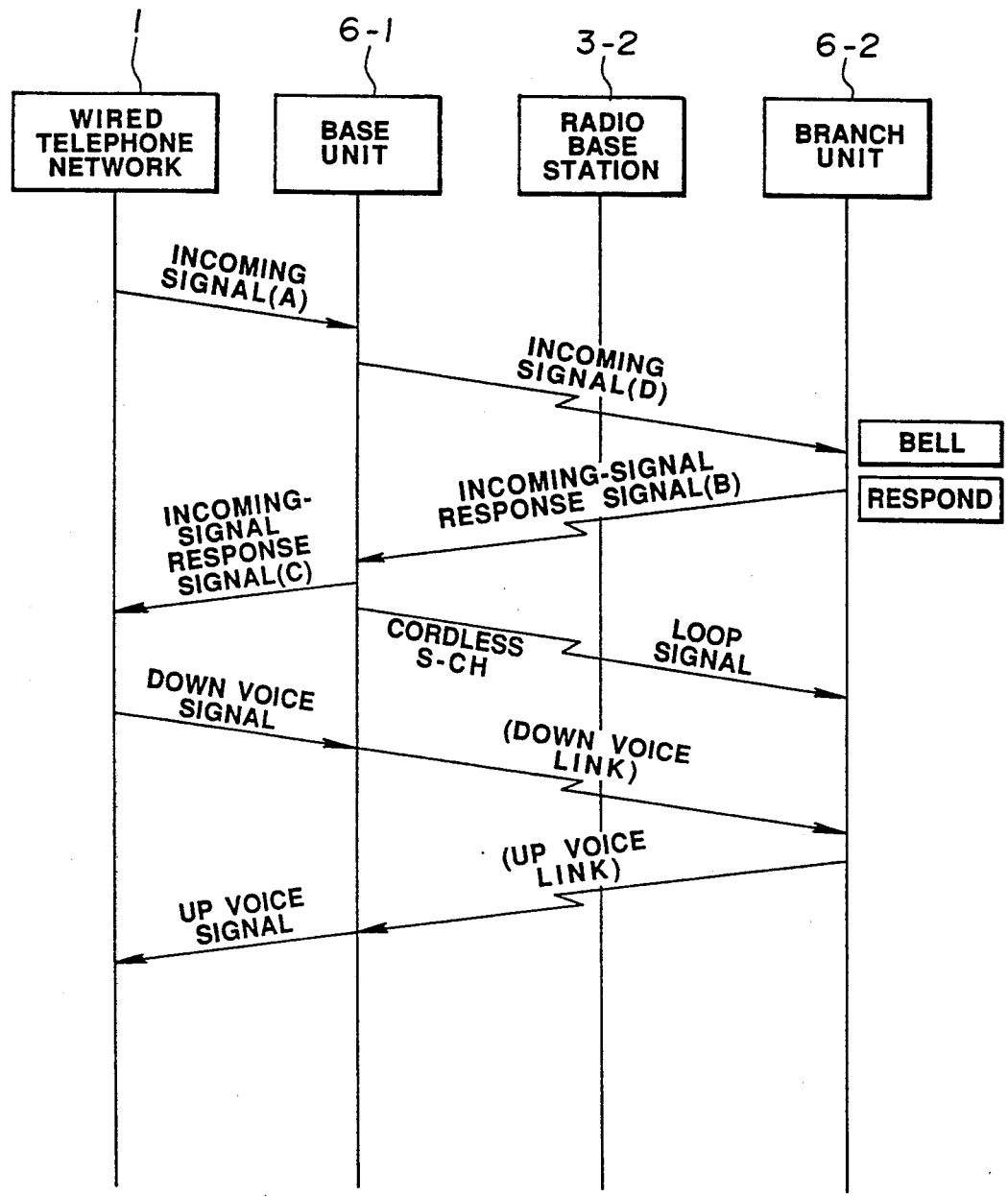
FIG. 20 is a sequence chart for explaining an incoming-signal handling procedure in the sixth embodiment.

Meanwhile, when the branch unit 6-2 lies within the radio zone 6-3 of the base unit 6-1 in accordance with the schedule, the incoming signal is informed from the base unit 6-1 to the branch unit 6-2 in accordance with such a procedure as shown in FIG. 20.

First, an incoming signal (A) is sent from the wired telephone network 1 to the base unit 6-1. The base unit 6-1, when receiving the incoming signal (A), the controller 74 provided in the base unit 6-1 determines on the basis of the schedule stored in the memory 79 that the branch unit 6-2 is located in the radio zone 6-3 of the base unit 6-1. And after such determination, the controller 74 sends to the transmitter 75 an incoming signal (D) containing the cordless ID code of the branch unit 6-2 for transmission of the incoming signal (D) therefrom.

The branch unit 6-2, when receiving the incoming signal (D), informs the user of the presence of the incoming signal. When the user answers to the incoming signal, the branch unit 6-2 transmits an incoming-signal response signal (B).

The base unit 6-1, when receiving the incoming-signal response signal (B), sends an incoming-signal response signal (C) to the wired telephone network 1, determines idle one of the speech channels for use in the cordless telephone system, and transmits a loop signal indicative of the determined idle speech channel. Thereafter, the base unit 6-1 switches the control channel to the determined speech channel.

The branch unit 6-2, when receiving the loop signal, switches the current channel to the speech channel indicated by the received loop signal to establish a voice circuit.

Through such procedure, a speech communication connection is established between the wired telephone network 1 and the branch unit 6-2 through the base unit 6-1 to start a speech.

Incidentally, the base unit 6-1 comprises the recorder/reproducer 80 whose automatic answering function can be activated on the basis of the schedule of the branch unit 6-2. That is, with respect to the registration of this schedule, when the schedule indicative of the fact that the base unit is located outside all the radio zones is previously registered in accordance with, for example, such a procedure as shown in FIG. 8(c), this means that the automatic answering function is specified so that, when the system receives an incoming signal in a time period between 10:00 p.m. and 00:00 a.m., the base unit 6-1 activates its automatic answering function on the basis of the schedule. As a result, a message previously recorded in the recorder/reproducer 80 can be automatically reproduced and sent to the speech party or a message from the speech party can be automatically recorded in the recorder/reproducer 80.

Figure 21:
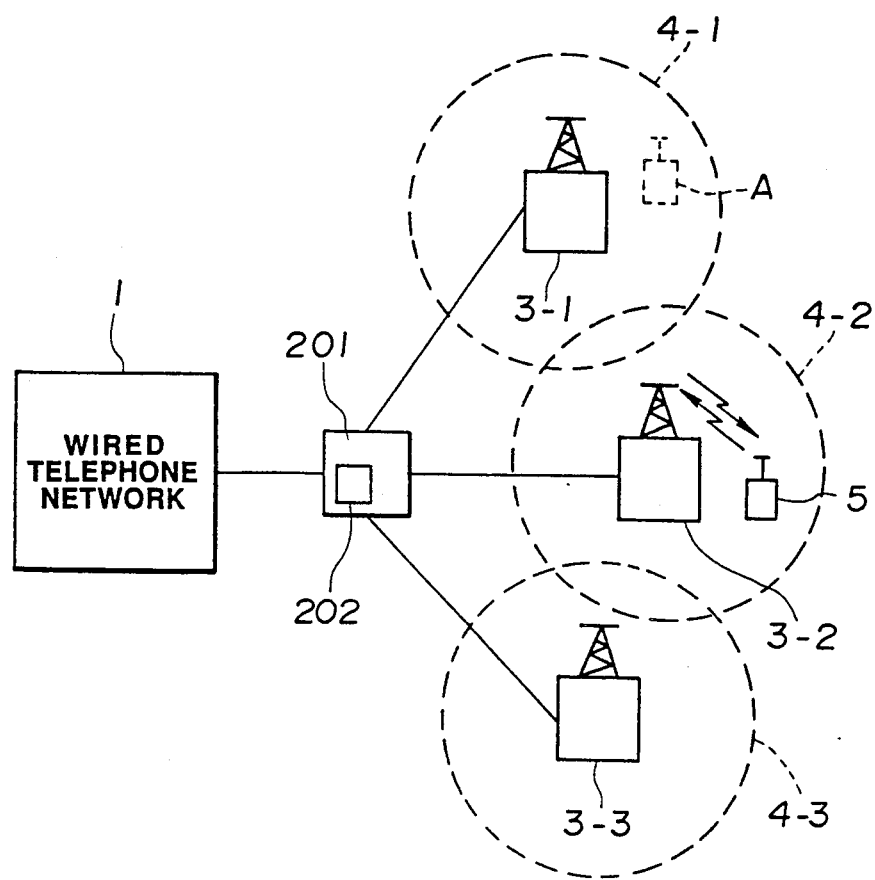
FIG. 21 is a block diagram of a radio communication system in accordance with a seventh embodiment of the present invention.

Referring to FIG. 21, there is shown a block diagram of a seventh embodiment of the radio communication system to which an incoming-signal processing system of the present invention is applied.

In the present embodiment, a radio control station 201 is disposed between the respective radio base stations 3-1 to 3-3 and the wired telephone network 1. The radio control station 201 performs exchanging and connecting operation between the radio base stations 3-1 to 3-3 and the wired telephone network 1, that is, performs general control of these radio base stations 3-1 to 3-3.

Figure 22:
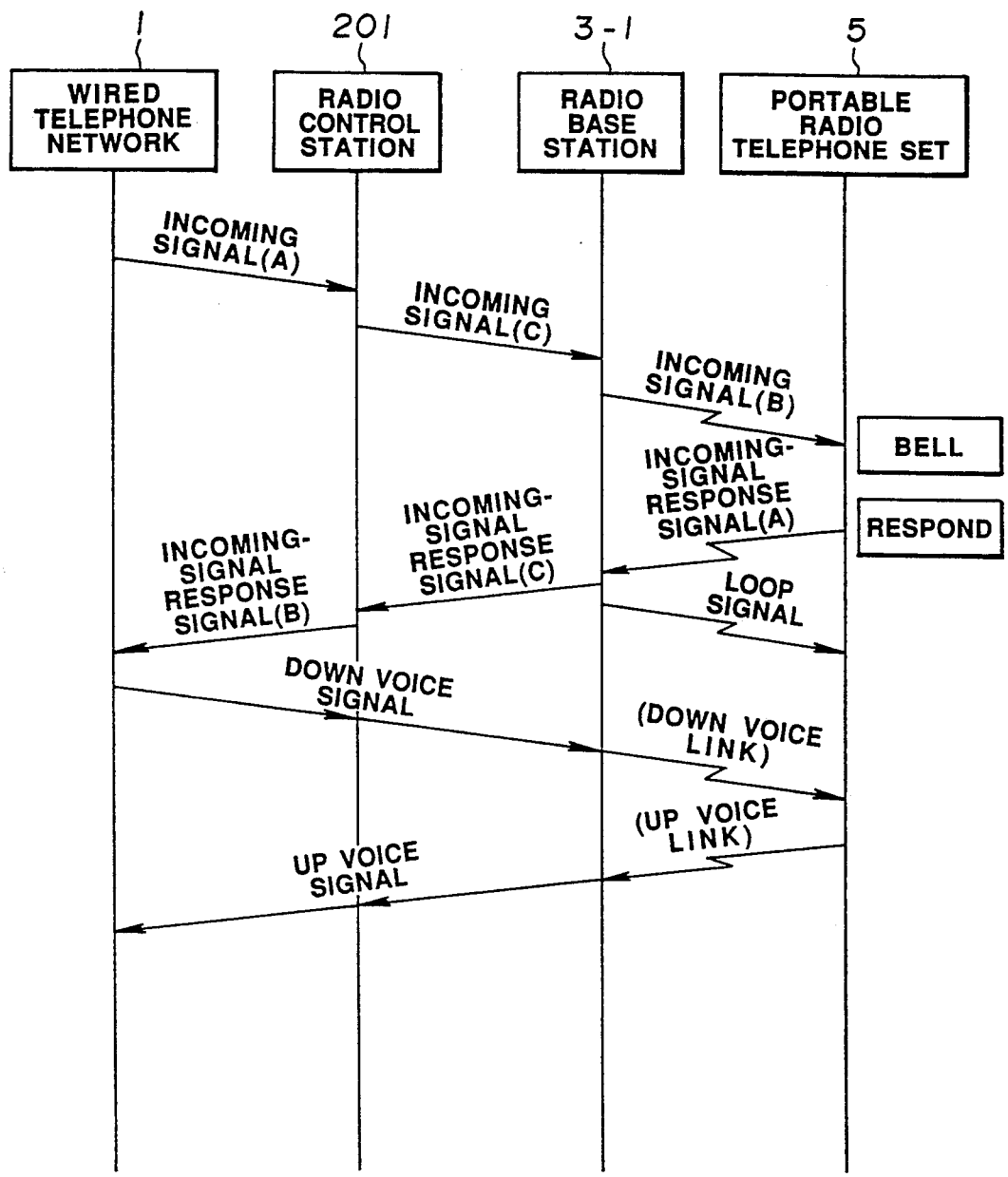
FIG. 22 is a sequence chart for explaining an incoming-signal handling procedure in the seventh embodiment.

With such an arrangement, the schedule of the portable radio telephone set 5 is registered not in the radio base station 3-2 but in a memory built in the radio control station 201. In this case, when the system receives an incoming signal to be directed to the portable radio telephone set 5, the radio control station 201 can determine one of the radio zones 4-1 to 4-3 where the portable radio telephone set is located on the basis of the schedule stored in the memory 202 of the radio control station 201. For this reason, the need for once informing the presence of the incoming signal directed to the portable radio telephone set 5 to the radio base station 3-2 and transferring the incoming signal to another radio base station depending on the contents of the schedule can be eliminated. That is, the presence of the incoming signal directed to the portable radio telephone set 5 is informed to the portable radio telephone set 5 in accordance with such a procedure as shown in FIG. 22.

First, an incoming signal (A) indicative of the presence of an incoming signal is sent from the wired telephone network 1 to the radio control station 201. The radio control station 201, when receiving the incoming signal (A), reads out the schedule of the portable radio telephone set 5 from the memory 202 and determines one of the radio zones 4-1 to 4-3 where the portable radio telephone set 5 is located on the basis of the read-out schedule. When the portable radio telephone set 5 is determined to be located in the radio zone 4-1 for example, the radio control station 201 sends an incoming signal (C) to the radio base station 3-1 having the radio zone 4-1.

The radio base station 3-1, when receiving the incoming signal (C), transmits an incoming signal (B) to the portable radio telephone set 5. And the radio base station 3-1 receives an incoming-signal response signal (A) from the portable radio telephone set 5, sends an incoming-signal response signal (C) to the radio control station 201, and also transmits a loop signal to the portable radio telephone set 5. In this way, an interconnection is established between the radio base station 3-2 and the portable radio telephone set 5 through a radio line of the speech channel.

Meanwhile, the radio control station 201, when receiving the incoming-signal response signal (C) from the radio base station 3-1, sends an incoming-signal response signal (B) to the wired telephone network 1, whereby the radio base station 3-1 is connected with the wired telephone network 1 through the radio control station 201 so that a transmission path is established between the wired telephone network 1 and the portable radio telephone set 5. In other words, a down voice signal from the wired telephone network 1 is transmitted from the radio control station 201 through the radio base station 3-1 to the portable radio telephone set 5, while an up voice signal transmitted from the portable radio telephone set 5 is transmitted from the radio base station 3-1 through the radio control station 201 to the wired telephone network 1.

Therefore, in the present embodiment, even when the portable radio telephone set 5 is located in any one of the respective radio zone 4-1 to 4-3, the radio control station 201 can inform the portable radio telephone set 5 of the presence of the incoming signal via one of the radio base stations while eliminating the need for transferring the incoming signal from the radio base station to the other radio base stations.

Figure 23:
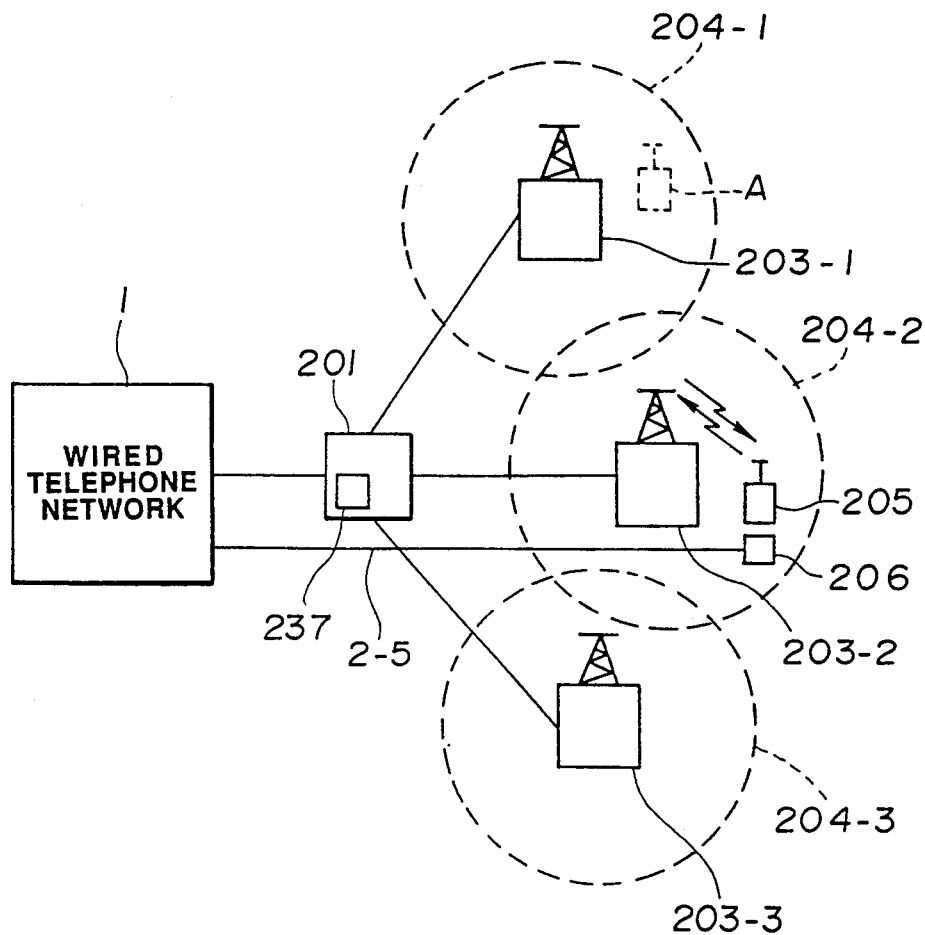
FIG. 23 is a block diagram of a radio communication system in accordance with an eighth embodiment of the present invention.

Next shown in FIG. 23 is a block diagram of a radio communication system in accordance with an eighth embodiment of the present invention.

In the present embodiment, the wired telephone network 1 shown in FIG. 21 is connected through a wired line 2-5 with a wired terminal 206. The wired terminal 206 is, for example, a personal computer which is located at a predetermined position in a radio zone 204-2.

The wired terminal calls the radio control station 201 through the wired telephone network 1 to transmit the schedule of the portable radio telephone set 5 from the wired terminal 206 via the wired telephone network 1 to the radio control station 201 and thereby to register the schedule in the radio control station 201. The schedule registering operation will be explained below.

First, when the wired terminal 206 dials the telephone number of the radio control station 201, this causes the wired telephone network 1 to call the radio control station 201. The radio control station 201, when responding to the call, causes realization of a connection between the wired terminal 206 and the radio control station 201 through the wired telephone network 1, thus enabling communication there between.

Thereafter, the ID code of the portable radio telephone set 5 and a schedule data are transmitted from the wired terminal 206 to the radio control station 201 to be stored in a memory 237 built in the radio control station 201, thereby completing the registering operation of the schedule of the portable radio telephone set 5.

The position of the wired terminal 206 is not specifically limited.

Figure 24:
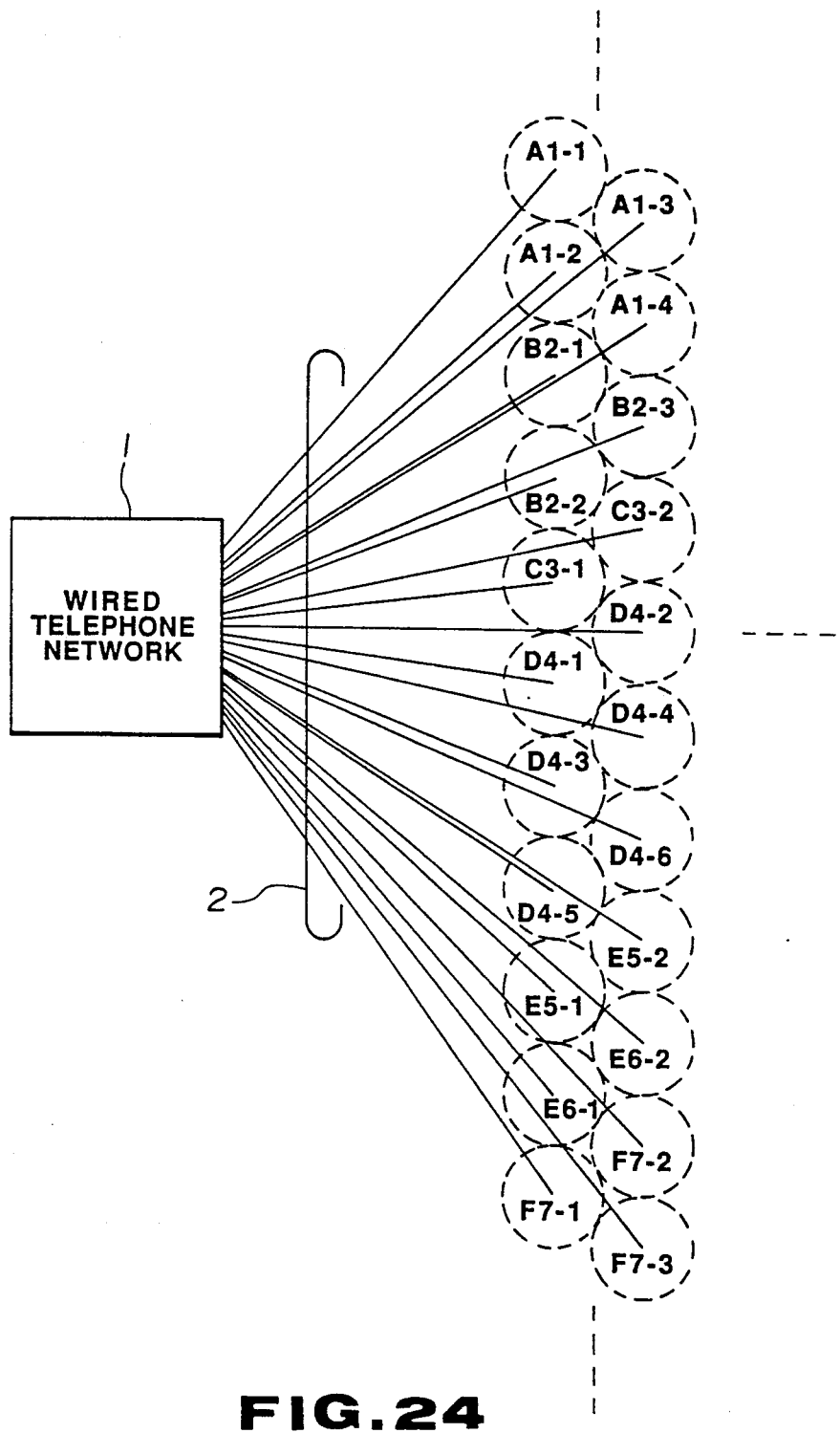
FIG. 24 is a block diagram of a radio communication system in accordance with a ninth embodiment of the present invention.

FIG. 24 shows an eighth embodiment of the radio communication system of the present invention, wherein many radio zones are set. These radio zones have respective radio base stations (not shown) which are connected through their wired lines 2 with the wired telephone network 1. These radio zones are also divided into a plurality of radio sub-zone groups. For example, a group of radio zones A1-1 to A1-4 belong to a radio zone group A1, while a group of radio zones B2-1 to B2-3 belong to a radio zone group B2.

In the case where the radio zones are set to have such an arrangement as mentioned above, when the schedule of the portable radio telephone set 5 or branch unit 6-2 is entered in accordance with such a procedure as shown, for example, in FIG. 25, the radio zones or radio zone groups can be registered.

Figure 25A:
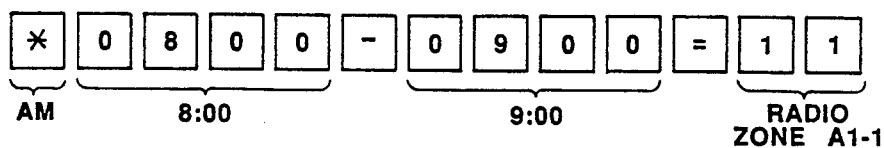
FIGS. 25a-c show an example of a schedule registering procedure in the ninth embodiment.
Figure 25B:
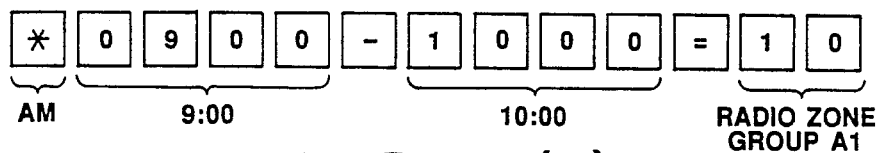
Figure 25C:
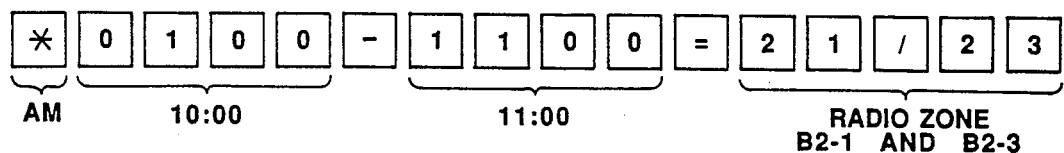
Figure 26:
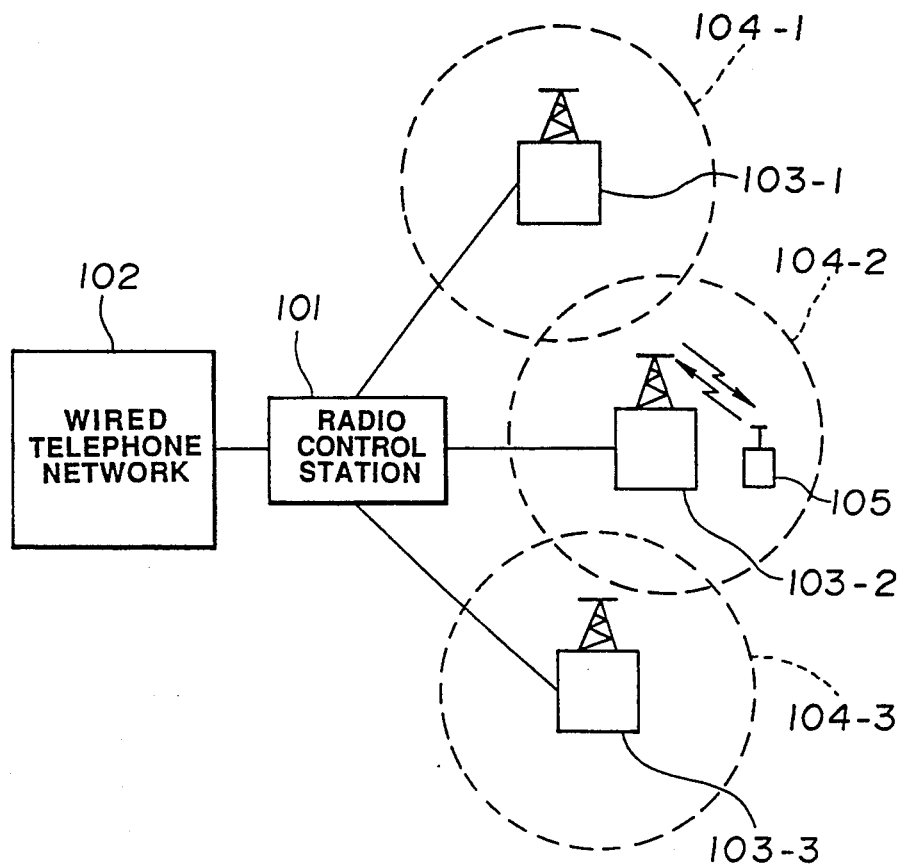
FIG. 26 is a block diagram of a conventional radio communication system.

In more detail, the user operates the key input board in accordance with such a procedure as shown in FIG. 25(a), a schedule saying the fact that the portable radio telephone set or branch unit is located in the radio zone A1-1 in a time period from 8:00 a.m. to 9:00 a.m. is registered. When the user operates the key input board in accordance with such a procedure as shown in FIG. 25(b), a schedule saying the fact that the portable radio telephone set or branch unit is located in the radio zone group A1 in a time period from 9:00 a.m. to 10:00 a.m. is registered. When the system receives an incoming signal, an incoming signal is repetitively transmitted in the radio zone group A1 in a cyclic order of the radio zones A1-1→A1-2→A1-3→A1-4→A1-1, so that a speech is carried out in the radio zone having a response to it. Further, when the user operates the key input board in accordance with such a procedure as shown in FIG. 25(c), a schedule saying the fact that the portable radio telephone set or branch unit is located in the radio zones B2-1 and B2-3 in a time period from 10:00 a.m. to 11:00 a.m. is registered. When the system receives an incoming signal, an incoming signal is repetitively transmitted in a cyclic order of the radio zones B2-1→B2-3→B2-1 so that a speech is carried out in the radio zone having a response to it.

Although the radio communication system including the wired telephone network, radio base stations, radio control station and portable radio telephone sets has been exemplified in the foregoing embodiments, it goes without saying that the present invention may be modified in various ways, as long as it includes an exchanging means, a base station and a mobile station. Further, the portable radio telephone set and the branch unit in the cordless telephone set have been exemplified in the foregoing, but the present invention is not restricted to the specific examples and thus they may be a car telephone set and a pager. Furthermore, such a mobile terminal may be a composite portable radio telephone set having a pager built therein. In addition, though the public network has been shown as an exemplary wired network in the foregoing embodiments, the present invention is not limited to the particular example and may be applied to any exchange network regardless of analog or digital transmission, as long as the network uses metal cables, optical fibers and so on.

What is claimed is:

1. A radio communication system comprising:
   a plurality of base stations each having a different radio zone and being connected through a wired line to a wired line network;
   a plurality of groups of radio mobile terminals, each group of radio mobile terminals assigned to a different one of the base stations, the radio mobile terminals being movable among the radio zones;
   a plurality of memory means each provided in one of the base stations, for storing schedule data including data on respective radio zones in which the respective groups of radio mobile terminals assigned to the respective base stations are to be located and time periods during which the respective groups of radio mobile terminals are to be located in the respective radio zones; and
   call control means, when an incoming call is received through one wired line from the wired line network to one radio mobile terminal assigned to one base station connected to said one wired line, for checking whether said one radio mobile terminal has moved into another radio zone at the time the incoming call is received by referencing the schedule data stored in the memory means in said one base station, if it is judged that said one radio mobile terminal has not moved into another radio zone, for calling said one radio mobile terminal through said one base station and, if it is judged that said one radio mobile terminal has moved into another radio zone, for transferring the incoming call to a base station having a radio zone into which said one radio mobile terminal has moved and calling said one radio mobile terminal through the base station having the radio zone into which said one radio mobile terminal has moved.

2. A radio communication system as set forth in claim 1, wherein each base station includes a plurality of radio units for providing radio linkages with the plurality of radio mobile terminals present within the radio zone of each base station and a line controller for controlling the connections between the wired line connected to each base station and the radio units, and wherein the memory means is provided in the line controller.

3. A radio communication system as set forth in claim 2, wherein the line controller includes exchange connection means for exchanging the connections between the wired line and the radio units and control means for controlling the exchange connection means and concentratedly controlling the radio units.

4. A radio communication system as set forth in claim 1, further including registering means provided in each radio mobile terminal, for registering the schedule data of the radio mobile terminal through a radio link into the memory means of the base station to which the radio mobile terminal is assigned.

5. A radio communication system as set forth in claim 4, wherein said registering means includes:
schedule data storage means provided in each radio mobile terminal, for storing the schedule data input from the radio mobile terminal; and
transfer means, when registering the schedule data of the radio mobile terminal, for transferring the schedule data stored in the schedule data storage means to the base station to which the radio mobile terminal is assigned through the radio link.

6. A radio communication system as set forth in claim 4, wherein the registering means includes:
external storage means detachably connected to the radio mobile terminal, for previously storing the schedule data of the radio mobile terminal;
reading means provided in each radio mobile terminal, for reading out the schedule data from the external storage means when the external storage means is connected to the radio mobile terminal; and
transfer means, when registering the schedule data, for transferring the schedule data read out by the reading means to the base station to which the radio mobile terminal is assigned through the radio link.

7. A radio communication system as set forth in claim 1, further including:
a wired terminal connected to the wired line network through the wired line and provided in association with one of the base stations; and
registering means, when registering the schedule data into the memory means of the associated base station, for calling the associated base station through the wired line network and registering the schedule data of the radio mobile terminal assigned to the associated base station into the memory means of the associated base station.

8. A radio communication system as set forth in claim 1, further including display means provided in each radio mobile terminal, for receiving through a radio link the schedule data of the radio mobile terminal stored in the memory means of the base station to which the radio mobile terminal is assigned, and for displaying the schedule data to confirm the schedule data.

9. A radio communication system as set forth in claim 1, wherein the memory means stores as the schedule data an incoming call inhibiting time period during which a response to an incoming call is inhibited, and further includes call inhibiting means, when the incoming call is received from the wired line network through one wired line to one radio mobile terminal assigned to one base station connected to said one wired line, for inhibiting the calling of said one radio mobile terminal when said one radio mobile terminal is in the incoming call inhibiting time period by referencing the schedule data stored in the memory means of said one base station.

10. A radio communication system comprising:
a plurality of base stations each having a different radio zone and each being connected through a wired line to a wired line network;
a plurality of groups of radio mobile terminals, each group of radio mobile terminals assigned to a different one of the base stations, the radio mobile terminals being movable among the radio zones; and
a wired terminal connected to the wired line network through the wired line and being provided in association with one of the base stations, the wired terminal being set as a transfer designation for a group of radio mobile terminals assigned to the one associated base station,
wherein the wired terminal includes:
memory means provided in the wired terminal, for storing schedule data including radio zones in which the radio mobile terminals assigned to the one associated base station are to be located and time periods during which the radio mobile terminals assigned to the one associated base station are to be located in the radio zones; and
call control means, when an incoming call is received from said wired line network to one radio mobile terminal assigned to the one associated base station, for receiving the incoming call at the wired terminal as the transfer designation for said one radio mobile terminal, for checking whether said one radio mobile terminal has moved into another radio zone at the time the incoming call is received by referencing the schedule data stored in the memory means of the wired terminal, if it is judged that said one radio mobile terminal has not moved into another radio zone, for transferring the incoming call to the one associated base station to call said one radio mobile terminal through the one associated base station and, if it is judged that said one radio mobile terminal has moved into another radio zone, for transferring the incoming call to one of the base stations having a radio zone into which said one radio mobile terminal has moved to call said one radio mobile terminal through said one of the base stations having the radio zone into which said one radio mobile terminal has moved.

11. A radio communication system comprising:
a plurality of first base stations each having a different radio zone and being connected through a wired line to a wired line network;
a plurality of groups of first radio mobile terminals, each group of first radio mobile terminals assigned to a different one of the first base stations, the first radio mobile terminals being movable among the radio zones:
a second base station connected to the wired line network through the wired line and being provided in association with one of the first base stations;
a second radio mobile terminal connected to the second base station through a radio link;
memory means provided in the second base station, for storing schedule data including data on the radio zones in which the second radio mobile terminal is to be located and time periods during which the second radio mobile terminal is to be located in the radio zones; and call control means, when an incoming call is received from the wired line network to the second radio mobile terminal, for checking whether the second radio mobile terminal has moved into another radio zone at the time the incoming call is received by referencing the schedule data stored in the memory means of the second base station, if it is judged that the second radio mobile terminal has not moved into another radio zone, for calling the second radio mobile terminal through the second base station and, if it is judged that the second radio mobile terminal has moved into another radio zone, for transferring the incoming call to one of the first base stations having a radio zone into which the second radio mobile terminal has moved and calling the second radio mobile terminal through said one of the first base stations having the radio zone into which the second radio mobile terminal has moved.

12. A radio communication system as set forth in claim 11, further including registering means provided in the second radio mobile terminal, for registering the schedule data of the second radio mobile terminal in the memory means of the second base station through a radio link.

13. A radio communication system as set forth in claim 11, further including display means provided in the second radio mobile terminal, for receiving through a radio link the schedule data of the second radio mobile terminal stored in the memory means of the second base station and for displaying the schedule data to confirm the schedule data.

14. A radio communication system as set forth in claim 11, wherein the memory means stores as the schedule data an incoming call inhibiting time period during which a response to an incoming call is inhibited, and wherein the second base station includes automatic response means, when the incoming call is received from the wired line network to the second radio mobile terminal, for inhibiting the calling of the second radio mobile terminal when the second radio mobile terminal is in the incoming call inhibiting time period by referencing the schedule data stored in the memory means of the second base station, and for sending a predetermined message to a caller and automatically storing a message from the caller.

15. A radio communication system comprising:
a radio control station connected to a wired line network;
a plurality of base stations each having a different radio zone and being connected through a wired line to the radio control station;
a plurality of groups of radio mobile terminals, each group of radio mobile terminals assigned to a different one of the base stations, the radio mobile terminals being movable among the radio zones;
memory means provided in the radio control station, for storing schedule data including data on the radio zones in which the radio mobile terminals are to be located and time periods during which the radio mobile terminals are to be located in the radio zones; and
call control means, when an incoming call is received from the wired line network to one of the radio mobile terminals, for checking in which radio zone the one radio mobile terminal is located at the time the incoming call is received by referencing the schedule data stored in the memory means of the radio control station, and for calling the one radio mobile terminal through the base station having the radio zone in which the one radio mobile terminal is located.

16. A radio communication system as set forth in claim 16, further including:
a wired terminal connected to the wired line network through a wired line; and
registering means, when registering the schedule data into the memory means of the radio control station, for calling the radio control station from the wired terminal through the wired line network, and registering the schedule data of the plurality of radio mobile terminals into the memory means of the radio control station.

17. A radio communication system comprising:
a plurality of groups of base stations, each base station being connected through a wired line to a wired line network, each group of base stations having a different group of radio zones;
a plurality of groups of radio mobile terminals, each group of radio mobile terminals assigned to a different one of the groups of base stations, the radio mobile terminals being movable among the radio zones;
memory means provided in each base station, for storing schedule data including data on the radio zone groups in which the respective groups of radio mobile terminals assigned to the respective groups of base stations are to be located and time periods during which the radio mobile terminals are to be located in the radio zone groups; and
call control means, when an incoming call is received from the wired line network through one wired line to one radio mobile terminal assigned to the base station connected to said one wired line, for checking whether said one radio mobile terminal has moved into another radio zone group at the time the incoming call is received by referencing the schedule data stored in the memory means of the base station connected to said one wired line, if it is judged that said one radio mobile terminal has not moved into another radio zone group, for calling said one radio mobile terminal through each of the base stations one by one to which said one radio mobile terminal is assigned and, if it is judged that said one radio mobile terminal has moved into another radio zone group, for transferring the incoming call to the plurality of base stations having the radio zone group into which said one radio mobile terminal has moved and calling said one radio mobile terminal through each of the base stations one by one having the radio zone group into which said one radio mobile terminal has moved.

18. A method of controlling a radio communication system including:
a plurality of base stations each having a different radio zone and being connected through a wired line to a wired line network;
a plurality of groups of radio mobile terminals, each group of radio mobile terminals assigned to a different one of the base stations, the radio mobile terminals being movable among the radio zones; and
a plurality of memory means each provided in one of the base stations, for storing schedule data including data on the respective radio zones in which the respective groups of radio mobile terminals assigned to the respective base stations are to be located and time periods during which the respective groups of radio mobile terminals are to be located in the radio zones, the method comprising the steps of:

registering the schedule data of the radio mobile terminals into the memory means;

when an incoming call is received through one wired line from the wired line network to one radio mobile terminal assigned to one base station connected to said one wired line, checking whether said one radio mobile terminal has moved into another radio zone at the time the incoming call is received by referencing the schedule data stored in the memory means in said one base station;

if it is judged that said one radio mobile terminal has not moved into another radio zone at the time the incoming call is received, calling said one radio mobile terminal through said one base station; and if it is judged that said one radio mobile terminal has moved into another radio zone at the time the incoming call is received, transferring the incoming call to a base station having a radio zone into which said one radio mobile terminal has moved and calling said one radio mobile terminal through the base station having the radio zone into which said one radio mobile terminal has moved.

19. A method of controlling a radio communication system as set forth in claim 18, wherein the registering step includes the steps of:

storing the schedule data of the radio mobile terminals input from the radio mobile terminals; and sending the stored schedule data to the memory means of the base station to which the radio mobile terminal is assigned through a radio link.

20. A method of controlling a radio communication system including:

a plurality of base stations each having a different radio zone and being connected through a wired line to a wired line network;

a plurality of groups of radio mobile terminals, each group of radio mobile terminals assigned to a different one of the base stations, the radio mobile terminals being movable among the radio zones;

a wired terminal connected to the wired line network through the wired line, the wired terminal being provided in association with one of the base stations and being provided as a transfer designation for the group of radio mobile terminals assigned to the one associated base station; and memory means provided in the wired terminal, for storing schedule data including data on the radio zones in which the radio mobile terminals assigned to the one associated base station are to be located and time periods during which the radio mobile terminals assigned to the one associated base stations are to be located in the radio zones, the method comprising the steps of;

registering the schedule data of the radio mobile terminals into the memory means;

when an incoming call is received from the wired line network to one radio mobile terminal assigned to the one associated base station, receiving the incoming call at the wired terminal provided as the transfer designation for the radio mobile terminals assigned to the one associated base station;

checking whether said one radio mobile terminal has moved into another radio zone at the time the incoming call is received by referencing the schedule data stored in the memory means;

if it is judged that said one radio mobile terminal has not moved into another radio zone at the time the incoming call is received, transferring the incoming call to the one associated base station to call said one radio mobile terminal through the one associated base station; and if it is judged that said one radio mobile terminal has moved into another radio zone at the time the incoming call is received, transferring the incoming call to one of the base stations having a radio zone into which said one radio mobile terminal has moved and calling said one radio mobile terminal through said one of the base stations having the radio zone into which said one radio mobile terminal has moved.

* * * * *